(12) United States Patent
Thomas et al.

(10) Patent No.: US 8,224,914 B2
(45) Date of Patent: Jul. 17, 2012

(54) SYSTEMS AND METHODS FOR OPTIMIZING SMART MAIL

(75) Inventors: Rowland Hayes Thomas, Sunny Isles Beach, FL (US); Isaac Wieder, Sunny Isles Beach, FL (US); Shayne Paddock, Ottawa (CA)

(73) Assignee: ZDirect, Inc., Hallandale Beach, FL (US)

( * ) Notice: Subject to any disclaimer, the term of this patent is extended or adjusted under 35 U.S.C. 154(b) by 0 days.

(21) Appl. No.: 12/977,922

(22) Filed: Dec. 23, 2010

(65) Prior Publication Data

US 2011/0093552 A1 Apr. 21, 2011

Related U.S. Application Data

(62) Division of application No. 12/405,081, filed on Mar. 16, 2009, now Pat. No. 7,882,190, which is a division of application No. 11/034,781, filed on Jan. 14, 2005, now Pat. No. 7,523,167.

(60) Provisional application No. 60/536,712, filed on Jan. 16, 2004.

(51) Int. Cl.
*G06F 15/16* (2006.01)

(52) U.S. Cl. ........ 709/206; 709/217; 709/218; 709/219; 709/224; 709/226; 709/245

(58) Field of Classification Search .................. 709/206, 709/217, 218, 219, 224, 226, 245
See application file for complete search history.

(56) References Cited

U.S. PATENT DOCUMENTS

| | | | | |
|---|---|---|---|---|
| 6,101,486 A | * | 8/2000 | Roberts et al. | 705/14.66 |
| 6,138,156 A | * | 10/2000 | Fletcher et al. | 709/224 |
| 6,298,332 B1 | * | 10/2001 | Montague | 705/10 |
| 7,224,978 B2 | * | 5/2007 | Zellner et al. | 455/456.1 |
| 7,346,656 B2 | * | 3/2008 | Worthen | 709/204 |
| 7,890,581 B2 | * | 2/2011 | Rao et al. | 709/204 |
| 2001/0025300 A1 | * | 9/2001 | Miller et al. | 709/206 |
| 2002/0007304 A1 | * | 1/2002 | Kasajima et al. | 705/10 |
| 2003/0036960 A1 | * | 2/2003 | Suzaki et al. | 705/14 |
| 2003/0065941 A1 | | 4/2003 | Ballard et al. | |
| 2003/0135638 A1 | * | 7/2003 | Brabson et al. | 709/232 |
| 2004/0073691 A1 | * | 4/2004 | Sun | 709/230 |
| 2004/0093281 A1 | * | 5/2004 | Silverstein et al. | 705/26 |
| 2004/0249650 A1 | | 12/2004 | Freedman et al. | |
| 2005/0055232 A1 | * | 3/2005 | Yates | 705/1 |

OTHER PUBLICATIONS

Oberndorf, "Insight Aims for 1-to-1 Via E-mail", PrQuest, Apr. 1999.
Weiss, "Introduction to Dynamic HTML", http://www.wdvl.com/Authoring/DHTML/Intro/, Aug. 24, 1998.

* cited by examiner

*Primary Examiner* — Liangche A Wang

(74) *Attorney, Agent, or Firm* — Birch, Stewart, Kolasch & Birch, LLP

(57) ABSTRACT

Methods and systems provide for creating and generating dynamic mailings which include providing for static and dynamic content to be included in a dynamically generated e-mail; establishing filters for determining dynamic content; establishing a generic e-mail including static and dynamic content; selecting dynamic content using the filters; generating a dynamic e-mail based upon the generic e-mail and the dynamic content selected; and transmitting the dynamically generated e-mail.

18 Claims, 24 Drawing Sheets

Fig. 7A

Sample Hotel YTD Report

| Summary | Total | 7-May-03 |
|---|---|---|
| Number of YTD Emailers (3 Months) | 4 | |
| Total Registrations: | 4,441 | 4,441 |
| Number of distinct people to register: | 2,336 | 2,336 |
| New Emails received through sweeps: | 389 | 389 |

| | QUESTION | ANSWER | TOTAL | COUNT 7-MAY-03 |
|---|---|---|---|---|
| 1 | WOULD YOU LIKE TO OCCASIONALLY RECEIVE INFORMATION ABOUT SPECIAL OFFERS VIA THE INTERNET? | YES | 338 | 338 |
| | | NO | 20 | 20 |
| 2 | DO YOU PREFER PRE-PACKAGED VACATIONS OR DO YOU TYPICALLY PLAN YOUR OWN VACATION? | PACKAGED | 84 | 84 |
| | | PLAN YOUR OWN | 576 | 576 |
| 3 | HOW DO YOU PREFER TO BOOK YOUR MYRTLE BEACH VACATION? | AAA | 11 | 11 |
| | | INTERNET | 159 | 159 |
| | | PACKAGE | 19 | 19 |
| | | TOLL FREE | 167 | 167 |
| | | TRAVEL AGENT | 2 | 2 |
| 4 | HOW FAR IN ADVANCE TO YOU PLAN YOUR MYRTLE BEACH VACATION? | 14 - 90 DAYS | 1121 | 1121 |
| | | 3 - 14 DAYS | 251 | 251 |
| | | LAST MINUTE | 101 | 101 |
| | | OVER 90 DAYS | 551 | 551 |
| 5 | HOW MANY MYRTLE BEACH AREA VACATIONS TO TAKE PER YEAR? | MORE THAN THREE | 145 | 145 |
| | | ONE | 1028 | 1028 |
| | | TWO OR THREE | 692 | 692 |

*FIG. 7B*

| | QUESTION | ANSWER | TOTAL | COUNT |
|---|---|---|---|---|
| 6 | HOW OFTEN WOULD YOU LIKE TO OCCASIONALLY RECEIVE INFORMATION ABOUT SPECIAL OFFERS VIA THE INTERNET? | MONTHLY | 191 | 191 |
| | | NOT APPLICABLE | 16 | 16 |
| | | QUARTERLY | 53 | 53 |
| | | WEEKLY | 98 | 98 |
| 7 | I WOULD BE INTERESTED IN HEARING ABOUT PERIODIC SUNDAY-THURSDAY SPECIALS. | NO | 313 | 313 |
| | | YES | 1327 | 1327 |
| 8 | WHAT IS YOUR PRIMARY REASON FOR VISITING THE GRAND STRAND? | AMUSEMENTS & FAMILY ATTRACTIONS | 288 | 288 |
| | | BEACH | 1493 | 1493 |
| | | GOLF | 97 | 97 |
| | | SHOPPING | 51 | 51 |
| | | SHOWS/THEATER | 95 | 95 |
| 9 | WHAT TYPE OF FOOD OR RESTAURANT DO YOU PREFER TO FREQUENT AT LEAST ONE TIME DURING YOUR MYRTLE BEACH VACATION? | CHINESE | 44 | 44 |
| | | FAST FOOD | 95 | 95 |
| | | ITALIAN | 150 | 150 |
| | | NATIONAL CHAIN | 68 | 68 |
| | | SEAFOOD | 475 | 475 |
| | | STEAKHOUSE | 374 | 374 |

FIG. 7B (CONT.)

COMPASS COVE EMAIL LIST ANALYSIS FOUR MONTHS: JULY-OCT 2004

| DATA SOURCE/LIST NAME | JUNE | | | JULY | | | AUGUST | | | SEPT | | | OCT | | | TOTAL | | |
|---|---|---|---|---|---|---|---|---|---|---|---|---|---|---|---|---|---|---|
| | PRIMARY | SECONDRY | TOTAL | PRIMARY | SECONDRY | TOTAL | PRIMARY | SECONDRY | TOTAL | PRIMARY | SECONDRY | TOTAL | PRIMARY | SECONDRY | TOTAL | PRIMARY | SECONDRY | TOTAL |
| GUEST HISTORY | | | | | | | | | | | | | | | | | | |
| COMPASS COVE PMS | | | | | | | 350 | 47 | 397 | | | | 233 | 59 | 292 | 1,952 | 184 | 2,136 |
| 1998-2000 GUEST HISTORY | | | | | | | 125 | 3 | 128 | | | | | | | 125 | 3 | 128 |
| 2001 GUEST HISTORY | | | | | | | 1,982 | 85 | 2,067 | | | | | | | 1,982 | 85 | 2,067 |
| 2002 GUEST HISTORY | | | | | | | 2,651 | 139 | 2,790 | | | | | | | 2,651 | 139 | 2,790 |
| 2003 GUEST HISTORY | | | | | | | 4,736 | 206 | 4,942 | | | | | | | 4,736 | 206 | 4,942 |
| 2004 GUEST HISTORY | | | | | | | 1,594 | 0 | 1,594 | | | | | | | 1,594 | 0 | 1,594 |
| GUEST HISTORY TOTALS | 0 | 0 | 0 | 0 | 0 | 0 | 11,438 | 480 | 11,918 | 0 | 0 | 0 | 233 | 59 | 292 | 13,040 | 617 | 13,657 |
| LEADS | | | | | | | | | | | | | | | | | | |
| WEBSITE INQUIRIES | | | | | | | | | | | | | | | | | | |
| 2003 WEB SITE INQUIRIES | | | | | | | | | | 529 | 42 | 571 | | | | 529 | 42 | 571 |
| 2004 WEB SITE INQUIRIES | | | | | | | 2,232 | 87 | 2,319 | | | | | | | 2,232 | 87 | 2,319 |
| 2002 SOURCE LINK | | | | | | | 2,833 | 63 | 2,896 | | | | | | | 2,833 | 63 | 2,896 |
| 2003 SOURCE LINK | | | | | | | 720 | 265 | 985 | | | | | | | 720 | 265 | 985 |
| 2004 SOURCE LINK | | | | | | | 556 | 146 | 702 | | | | | | | 556 | 146 | 702 |
| DIXIE STAMPEDE COOP | | | | | | | 11,688 | 36 | 11,724 | | | | | | | 11,688 | 36 | 11,724 |
| GENERIC SOURCE | | | | | | | 1,286 | 1 | 1,287 | | | | | | | 1,286 | 1 | 1,287 |
| 2002 GENERIC SOURCE | | | | | | | 0 | 195 | 195 | | | | | | | 195 | 195 | |
| 2003 GENERIC SOURCE | | 655 | 655 | | 388 | 388 | 7,197 | 1,446 | 8,643 | 346 | 86 | 432 | | | | 7,197 | 1,446 | 8,643 |
| 2004 GENERIC SOURCE | | | | | | | 9,826 | 1,250 | 11,076 | | | | | | | 9,826 | 1,250 | 11,076 |
| | | | | | | | 1,114 | 34 | 1,148 | | | | | | | 1,114 | 34 | 1,148 |
| LEADS TOTAL | 0 | 655 | 655 | 0 | 388 | 388 | 37,452 | 3,523 | 40,975 | 875 | 128 | 1,003 | 0 | 0 | 0 | 38,176 | 3,565 | 41,351 |
| SWEEPSTAKES | | | | | | | | | | | | | | | | | | |
| 4NVACATIONSWEEPS | 0 | 0 | 0 | 0 | 0 | 0 | 67 | 468 | 535 | 42 | 292 | 334 | 11 | 54 | 65 | 118 | 752 | 870 |
| | 0 | 0 | 0 | 0 | 0 | 0 | 67 | 468 | 535 | 42 | 292 | 334 | 11 | 54 | 65 | 118 | 752 | 870 |

CONTINUED FROM FIG. 7C

| SUMMARYS | MONTHLY | TO DATE | MONTHLY | TO DATE | MONTHLY | TO DATE | MONTHLY | TO DATE | MONTHLY | TO DATE | PRIMARY | SECONDRY | TOTAL |
|---|---|---|---|---|---|---|---|---|---|---|---|---|---|
| GUEST HISTORY | 67 | 0 | 0 | 0 | 11,438 | 11,438 | 0 | 11,438 | 233 | 11,671 | 13,040 | 617 | 13,657 |
| LEADS | 655 | 655 | 388 | 1,043 | 37,452 | 38,495 | 875 | 39,370 | 0 | 39,370 | 38,176 | 3,565 | 41,351 |
| SWEEPSTAKES | 0 | 0 | 0 | 0 | 67 | 67 | 42 | 109 | 11 | 120 | 118 | 752 | 870 |
| | 655 | 655 | 388 | 1,043 | 48,957 | 50,000 | 917 | 50,917 | 244 | 51,161 | 51,334 | 4,934 | 55,878 |

PERCENTAGE OF LIST
GUEST HISTORY            25.4%
LEADS                    74.4%
INCENTIVE OFFERS/SWEEPS   0.2%

LIST QUALITY
A LIST: OPT IN EIGHT DATA POINTS     9.6%
B LIST: OPT IN FOUR DATA POINTS     25.6%
C LIST: EMAIL ONLY                  64.8%

ZMail

FIG. 7C (CONT.)

ACCOMODATIONS CLIENT 12 MONTH ANALYSIS NOV 2003 - OCT 2004 ZMAIL LIST BUILDER PROFILER MODULE
SWEEPSTAKES ONLY: REGISTRANTS / REFERRALS / CONVERSIONS / ROI

| | 12 MONTHS | | 2003 | | 2004 | | | | | | | | | |
|---|---|---|---|---|---|---|---|---|---|---|---|---|---|---|
| | TOTAL | PCT. | NOV | DEC | JAN | FEB | MAR | APR | MAY | JUN | JUL | AUG | SEP | OCT |
| ACCOMODATIONS CLIENT ONE | | | | | | | | | | | | | | |
| TOTAL SWEEPSTAKES REGISTRANTS | 23,702 | | 948 | 711 | 1,422 | 1,659 | 1,896 | 3,318 | 3,318 | 3,555 | 2,844 | 2,370 | 948 | 711 |
| UNIQUE REGISTRANTS | 12,569 | 53.0% | 503 | 377 | 754 | 880 | 1006 | 1760 | 1760 | 1885 | 1508 | 1257 | 503 | 377 |
| SWEEPS REFERRALS | 3,627 | 15.3% | 145 | 109 | 218 | 254 | 290 | 508 | 508 | 544 | 435 | 363 | 145 | 109 |
| UNIQUE NON GH SWEEPS REGISTRANTS | 3,532 | 14.9% | 141 | 106 | 212 | 247 | 283 | 494 | 494 | 530 | 424 | 353 | 141 | 106 |
| REVENUE CONVERSION OF NON GH REGISTRANTS | 306 | 8.7% | 12 | 9 | 18 | 21 | 24 | 43 | 43 | 46 | 37 | 31 | 12 | 9 |
| AVE GROSS REVENUE PER STAY* | | | $90.0 | $90.0 | $90.0 | $90.0 | $112.5 | $168.8 | $168.8 | $225.0 | $281.3 | $281.3 | $168.8 | $168.8 |
| ESTIMATE GROSS REVENUE | $55,596 | | $1,102 | $826 | $1,652 | $1,928 | $2,754 | $7,229 | $7,229 | $10,328 | $10,328 | $8,606 | $2,066 | $1,549 |
| ACCOMODATIONS CLIENT TWO | | | | | | | | | | | | | | |
| TOTAL SWEEPSTAKES REGISTRANTS | 23,564 | | 943 | 707 | 1,414 | 1,649 | 1,885 | 3,299 | 3,299 | 3,535 | 2,828 | 2,356 | 943 | 707 |
| UNIQUE REGISTRANTS | 8,010 | 34.0% | 320 | 240 | 481 | 561 | 641 | 1,121 | 1,121 | 1,202 | 961 | 801 | 320 | 240 |
| SWEEPS REFERRALS | 4,373 | 18.6% | 175 | 131 | 262 | 306 | 350 | 612 | 612 | 656 | 525 | 437 | 175 | 131 |
| UNIQUE NON GH SWEEPS REGISTRANTS | 3,532 | 15.0% | 141 | 106 | 212 | 247 | 283 | 494 | 494 | 530 | 424 | 353 | 141 | 106 |
| CONVERSION INTO REVENUE | 696 | 19.7% | 28 | 21 | 42 | 49 | 56 | 97 | 97 | 104 | 84 | 70 | 28 | 21 |
| AVE GROSS REVENUE PER STAY* | | | $112.50 | $112.50 | $112.50 | $112.50 | $135.00 | $191.25 | $191.25 | $270.00 | $337.50 | $337.50 | $191.25 | $191.25 |
| ESTIMATE GROSS REVENUE | $149,631 | | $3,132 | $2,349 | $4,698 | $5,481 | $7,517 | $18,635 | $18,635 | $28,188 | $28,188 | $23,490 | $5,324 | $3,993 |

*BASED ON AVG. 3 NIGHT STAY AND 75% RACK RATE

FIG. 7D

ZMail

SYSTEMS AND METHODS FOR OPTIMIZING SMART MAIL

This application is a Divisional of application Ser. No. 12/405,081, filed on Mar. 16, 2009, now U.S. Pat. No. 7,882,190 which is a Divisional of application Ser. No. 11/034,781, filed on Jan. 14, 2005, now U.S. Pat. No. 7,523,167 which claims priority to U.S. Provisional Application No. 60/536,712 filed on Jan. 16, 2004, the entire contents of which are hereby incorporated by reference in their entirety and for which priority is claimed under 35 U.S.C. §120 and 35 U.S.C. §119(e), respectively.

BACKGROUND OF THE INVENTION

1. Field of the Invention

The present invention relates generally to network applications and more specifically, to systems and methods for optimizing smart or dynamic mailings.

2. Description of Related Art

With the increase of commerce over the Internet, consumers are being bombarded with advertisements and mailings that include blanket promotions that do not dynamically take into account the consumer's personal needs and interests. Current mail systems store limited information in mailing lists that may only include name, address, and annual income. As such, when a consumer receives a promotion through a mailing, the consumer is not likely to seriously consider the information in the mailing, assuming the consumer opens the mailing at all. As such, not all, available information is taken advantage of.

Additionally, when a consumer completes a questionnaire, the questions included in the questionnaire are presented to all of the consumers answering the questions. Conventional questionnaires do not take into account the information provided in the answered questions in determining what questions should be asked next. For example, a questionnaire may include questions like "Do you play golf?", "Do you play tennis?", etc. If the person answers "Yes" to playing golf, conventional systems do not provide additional questions by trying to specify the consumer's interest in golf. As such, the information that is collected regarding the consumers is not utilized to its fullest extent in sending promotional information.

As such, there is a need for a system and method that optimizes smart or dynamic mailings.

SUMMARY OF THE INVENTION

Systems, methods and computer-readable mediums consistent with principles of some embodiments of the present invention provide for generating dynamic mailings including providing for static and dynamic content to be included in a dynamically generated mailing; establishing filters for determining dynamic content; establishing a generic mailing including static and dynamic content; selecting dynamic content using the filters; generating a dynamic mailing based upon the generic mailing and the dynamic content selected; and transmitting the dynamically generated mailing.

Alternatively, systems, methods and computer-readable mediums consistent with some embodiments of the present invention provide for providing for at least one static content and at least one dynamic content; and generating at least one dynamic mailing including at least one of static and dynamic content wherein the inclusion of the at least one dynamic content is determined by applying at least one filter associated with the at least one dynamic content.

Alternatively, systems, methods and computer-readable mediums consistent with some embodiments of the present invention provide for obtaining information for use in dynamic mailings, the method including providing a user an opportunity to opt-into a system; upon receipt of confirmation of an opt-in, querying the user with at least one processed-based question; storing the response to the at least one question as information and storing an association between the information and the user; and generating a dynamic mailing including content that is selected based on the stored information.

Alternatively, systems, methods and computer-readable mediums consistent with some embodiments of the present invention provide for obtaining information for use in dynamic mailings, the method including providing a user an opportunity to opt-into a system; upon receipt of confirmation of an opt-in, querying the user with at least one processed-based question; storing the response to the at least one question as information and storing an association between the information and the user; and generating a dynamic mailing including content that is selected based on the stored information.

Alternatively, systems, methods and computer-readable mediums consistent with some embodiments of the present invention provide for generating a mailing campaign including providing a set of tools; allowing the user to access the tools to create a template by designating and formatting at least one area; enabling the user to associate content with the at least one designated and formatted area; enabling a preview mode wherein the user may preview the template; and utilizing the template in a mailing campaign.

BRIEF DESCRIPTION OF THE DRAWINGS

The accompanying drawings, which are incorporated in and constitute a part of this specification, illustrate embodiments of the invention and, together with the description, explain the principles of the invention. In the drawings:

FIGS. 7A-7D depict exemplary reports that may be generated consistent with principles of some embodiments of the present invention;

DETAILED DESCRIPTION

Reference will now be made in detail to the features of the principles of the present invention, examples of which are illustrated in the accompanying drawings. Wherever possible, the same reference numbers will be used throughout the drawings to refer to the same or like parts.

Methods and systems consistent with some embodiments of the present invention provide for creating custom dynamic packages for opt-in e-mail recipients based upon a rules-based conflict resolution system that can determine whether or not individual selects or criterion, when combined, are mutually exclusive or acceptable and allows for the purchase of genuinely desired combinations. The system further determines the make-up of unique customized postcards or e-mails by utilizing a rules-based system in order to maximize the end result for the consumer (potential customer). The system resolves conflicting choices or combinations by creating a system of selects or criterion. The system allows a user to create his own conflict resolution system that supercedes ones from the system engine. The system creates a ranking system where the user decides what criterion or selects are important in creating the e-mail and allows for a specific value/weight for each individual characteristic. The system further ensures that not everyone on a list will end up with the default e-mail (template).

The present invention relates generally to methods and systems for optimizing smart mail. In systems consistent with features of some of embodiments of the present invention, users may create and send smart mail, or dynamic mail, by creating custom marketing packages to recipients, or consumers, who opt into a commerce system. By utilizing an HTML (Hypertext Markup Language) formatting tool, the user may create mailings including custom, static, and dynamic content and, using filters, determine recipients of the mailings from a database including consumers who opt into the system. Upon receipt of the custom mailing, the recipients, or consumers, may act on the marketing included in the mailing using additional tools located on a network. The user's actions performed after receipt of the mailing may be stored in the system for further use. For exemplary purposes, the custom mailings may be described with respect to vacation packages. However, it may be appreciated by one of ordinary skill in the art that the principles consistent with some embodiments of the present invention may be implemented with any type of marketing scheme.

System Architecture

Figure 1:
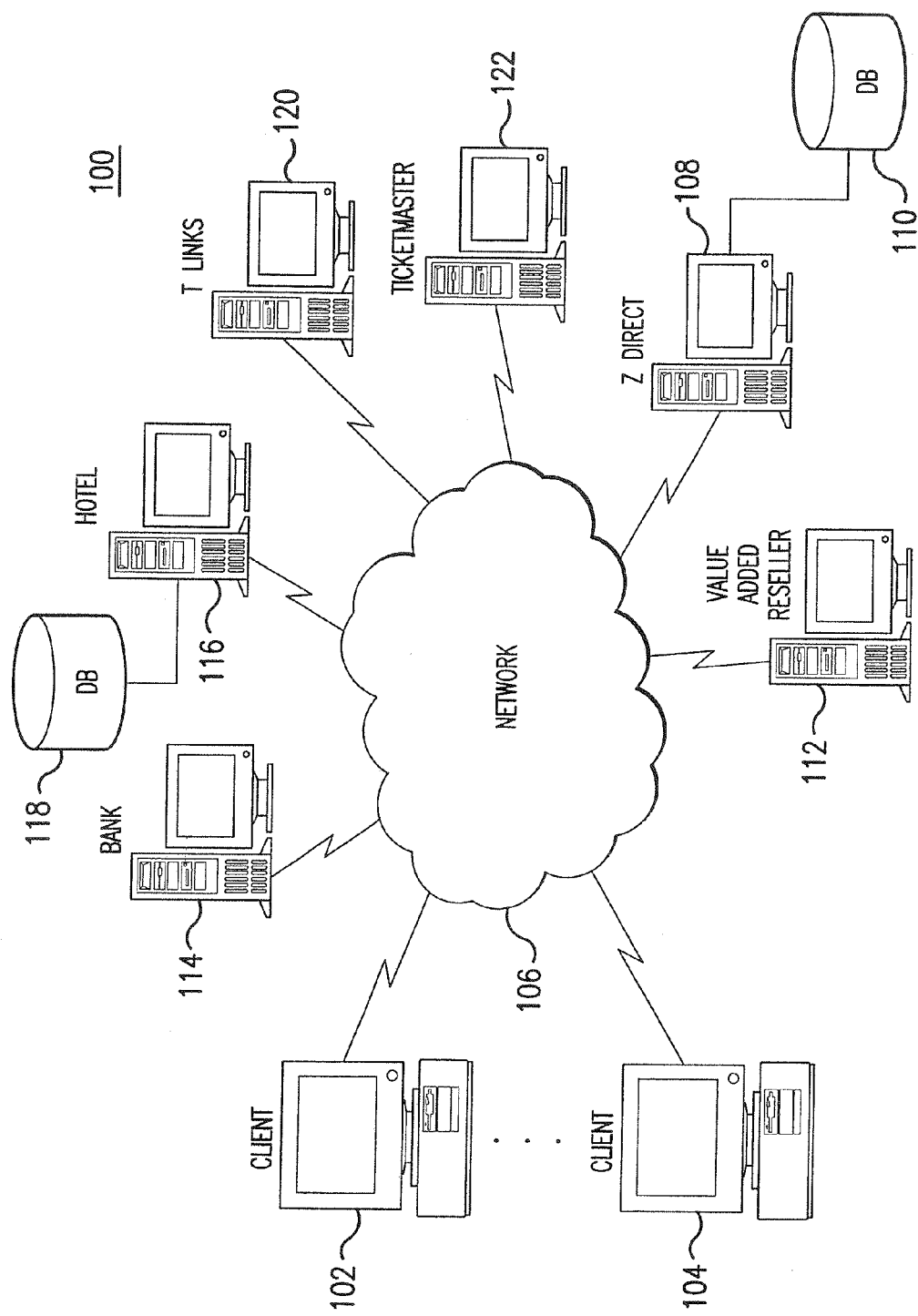
FIG. 1 is an exemplary system environment for implementing the features consistent with some embodiments of the present invention.

FIG. 1 is an exemplary diagram of a system environment 100 for implementing the principles consistent with some embodiments of the present invention. The components of system environment 100 can be implemented through any suitable combinations of hardware, software, and/or firmware. As shown in FIG. 1, system 100 includes a plurality of client devices 102 and 104 communicating with server 108 via network 106. While client device 102 is discussed herein, all features discussed with respect to client device 102 may similarly be applied to client device 104. Further, while only two client devices are depicted in FIG. 1, it may be appreciated by one of ordinary skill in the art that more client devices may operate within the system environment. Network 106 may be implemented as the Internet. It may further be appreciated that network 106 may be implemented as any local or wide area network, either public or private. It may further be appreciated that there may be additional networks operating in environment 106 wherein additional client devices may interact with server 112.

System environment 100 further includes database 110 communicably linked to server 108, server 112, which may act as an intermediary server between client devices 102 and 104, financial institution server 114, hotel or resort server 116, together with a communicably linked database 118, Tlinks server 120, and entertainment tickets provider server 122. Servers 114, 116, 120, and 112 may communicate with server 108 in order to schedule those offers that are included in custom mailings. It may be appreciated that additional servers, communicably liked to server 108, may reside on network 106 that provide services to consumers. Consumers, using client devices 102 and 104 may access server 108 through network 108. Users, through server computers, i.e., server 116, may access server 108 through network 106.

Figure 2:
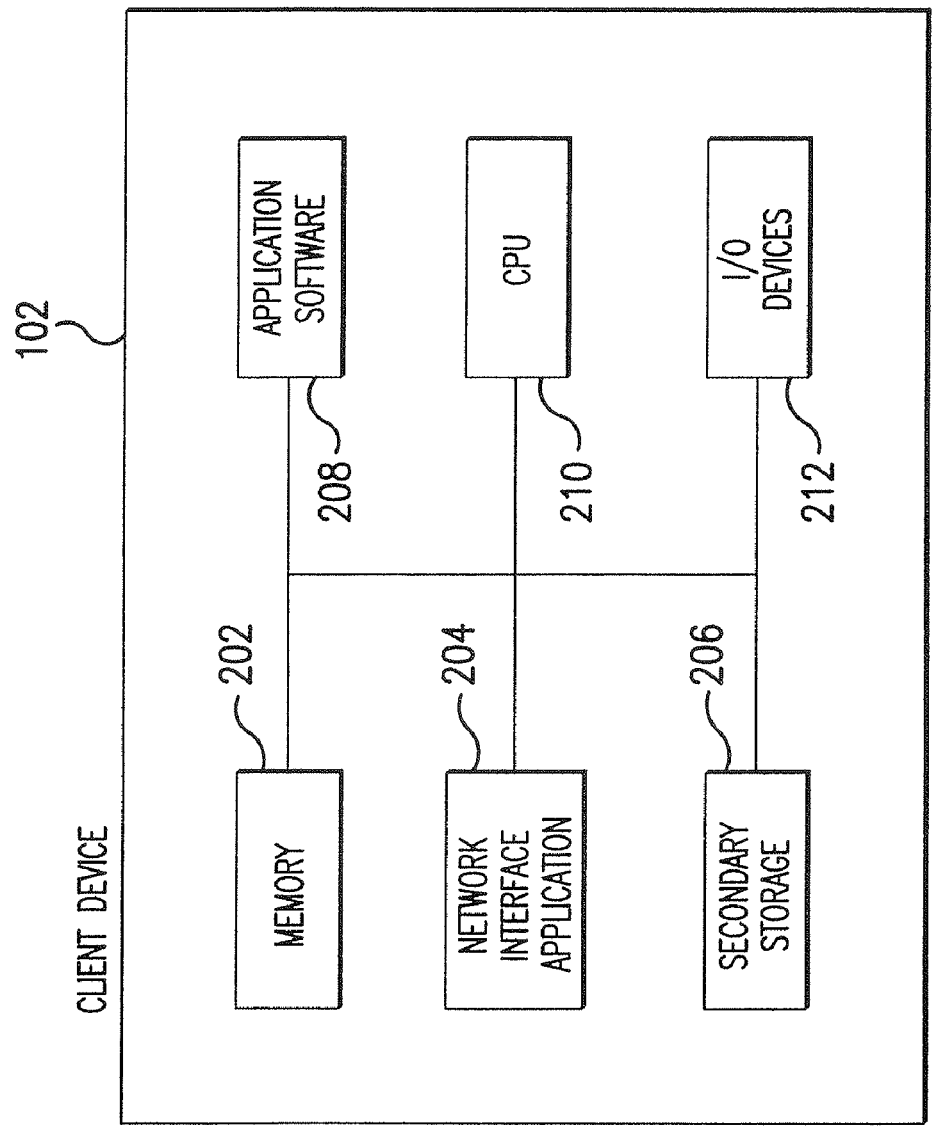
FIG. 2 is an exemplary block diagram of the components of a client computer, consistent with principles of some embodiments of the present invention.

FIG. 2 depicts an exemplary block diagram of client device 102 that may be implemented in system environment 100, consistent with the principles of some embodiments of the present invention. Client device 102 may be implemented as a personal computer, a workstation, or any personal handheld device, i.e., a Personal Digital Assistant (PDA), a cellular telephone, or any other device that is capable of operating, either directly or indirectly, on network 106. As shown in FIG. 2, client device 102 includes memory 202, network interface application 204, secondary storage 206, application software 208, central processing unit (CPU) 210, and input/output devices 212. Network interface 204 may be implemented as any conventional browser application to facilitate interaction with applications on server 108 on network 106. Input/output devices 212 may include, for example, a keyboard, a mouse, a video cam, a display, a storage device, and/or a printer. Client device 102 may be communicably linked with server computer 108 using application software 208.

Figure 3:
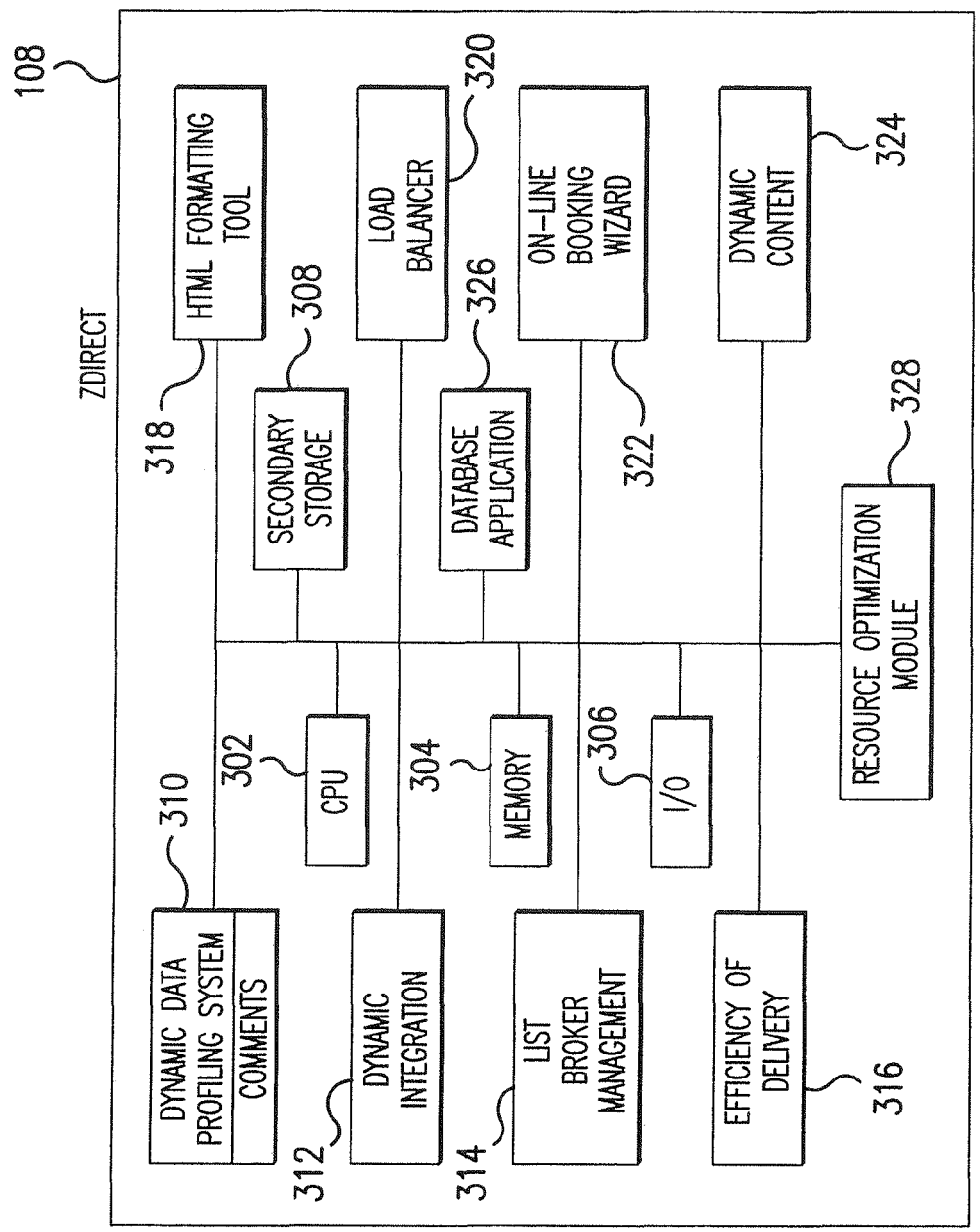
FIG. 3 is an exemplary block diagram of the components of a server computer, consistent with principles of some embodiments of the present invention.

FIG. 3 depicts an exemplary block diagram of server computer 108 that may be implemented in system environment 100, consistent with the principles of some embodiments of the present invention. As shown in FIG. 3, server computer 108 includes CPU 302, memory 304, input/output devices 306, secondary storage 308, dynamic data profiling system/comments module 310, dynamic integration module 312, list broker management module 314, efficiency of delivery module 316, HTML formatting tool module 318, load balancer module 320, on-line booking wizard module 322, dynamic content module 324, database application 326, and resource optimization module 328.

Dynamic Content Module

The dynamic content module 324 allows the user to input content that may be utilized in creating a dynamically generated e-mail. Content may be, for example, images or graphics, text, uploaded custom HTML, raw HTML code, HTML code using HTML editor as discussed herein, etc. Content may, for example, include information that defines the source of the e-mail. For example, if the user's organization was a hotel, one piece of content may include the hotel's logo. Additionally, content may include text that the user may input to relay some piece of information to a consumer. For example, the text may advise the consumer of some particular amenities that the hotel provides.

Content may additionally be static or dynamic. For example, static content is content that is included in the generic e-mail and is sent to all recipients of the e-mail. Examples of static content include, for example source information such as logos, contact information, images relating to the source of the e-mail such as a picture of the hotel, etc. However, dynamic content may only be sent depending upon whether the recipient satisfies certain conditions or filters set by the user. For example, the hotel may have a golf promotion where the consumer may pay one flat fee for the green fees, clubs, and cart. This promotion may only be sent to those consumers that play golf. As such, this piece of content may be created as a dynamic component whereby only those consumers who have previously indicated that they enjoy golf, as stored in their profile information, generated by the dynamic data profiling module, and identified using the filter(s) may receive this promotion. Both static and dynamic content are dynamic components that are used to create the generic e-mail.

Figure 4:
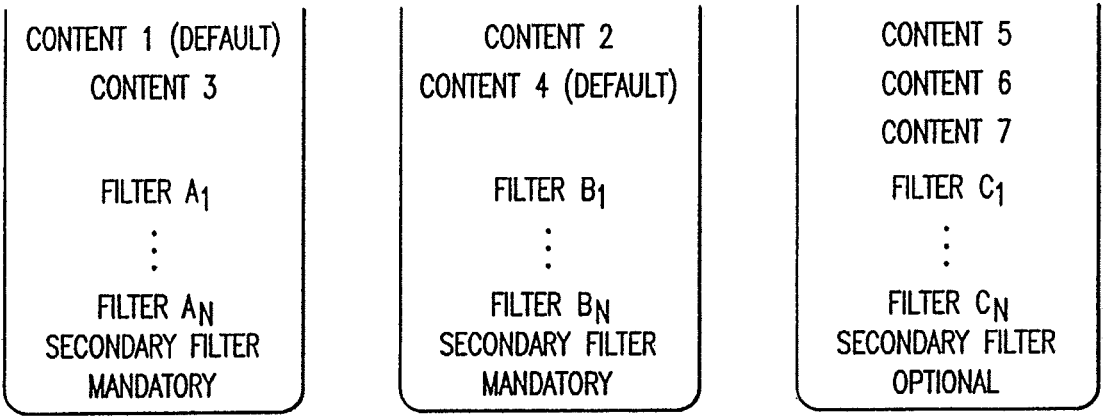
FIG. 4 depicts exemplary data provided by a user in creating a generic e-mail consistent with principles of some embodiments of the present invention.

In addition to providing content, the user may create different rates that are associated which each of the dynamic components. FIG. 4 depicts a chart that lists each of the dynamic components and the rates that are associated with each of the dynamic components. For example, content 1 has M number of rates associated with it. A rate may be implemented as the cost that is associated with that particular piece of content. For example, a three-night stay at a hotel may have a rate of $300 associated with it. If this piece of content was included in the mailing, then the rate would be considered in generating the total cost of the package.

Once the user provides the dynamic components and the rates, the user may establish buckets that are used to fill the dynamic content of the e-mail. For example, as shown in FIG. 4, bucket 1 includes two options to fill one dynamic component in the e-mail, namely content 1 and content 3. Additionally, the user sets each bucket as either mandatory or optional. If the bucket is set as mandatory, the one dynamic component must be selected for use in the e-mail. If the bucket is set as optional, then, one dynamic component may be selected for use in the e-mail, but, if, after the filters are applied, no piece of content may be applied, then no piece of content may be selected for inclusion in the mailing.

Each bucket additionally includes at least one filter that is utilized in determining which dynamic component is used in the e-mail. Each piece of content may be associated with a filter. In creating the filters, the user may provide at least one criterion that the consumer satisfies in order to determine which dynamic component is used. For example, content 1 may include an offer for 3 days, 2 nights representing a high-end room. Content 2 may include an offer for 4 days, 3 nights, representing an economy room. The user may create a filter, which searches the consumer profiles to determine if there is a preference for high-end rooms. If a consumer has a preference for a high-end room, then content 1 would be included in the e-mail. If the consumer does not have a preference for a high-end room, then content 1 would not be inserted into the e-mail.

Additionally, each mandatory bucket includes an indication of a default dynamic component, wherein if the consumer does not have any preference for either a high-end or a low-end room, using the example set forth above, the default dynamic component may be inserted into the e-mail.

A secondary filter may be associated with each bucket whereby if two dynamic components are selected based upon the primary filter, the secondary filter may be used to narrow the selection to only one dynamic component per bucket. Alternatively, the primary filter may be implemented to prioritize that which is important to the user where the secondary filter may be implemented to prioritize that which is important to the consumer. The highest priority identified from the secondary filter may then be selected as the piece from content from that bucket.

In addition to the above, rules may be established either by the user or by an administrator to prevent mutually exclusive pieces of content from being incorporated within the same mailing. For example, rules may be established where a consumer who is being offered a trip for two nights may not be offered a three-night stay at a hotel. These rules may be applied during the creation stage of the mailing or just prior to the mailing being sent. If a mailing violates any of the rules entered by the user or the administrator, one of ordinary skill in the art may appreciate that the mailing may be corrected in a number of ways, for example, replacing the objectionable content with acceptable content, removing the objectionable content, etc.

As shown in FIG. 4, bucket 3 is set as an optional bucket. As such, if the at least one primary filter does not produce a selection of any dynamic components, then no dynamic components may be selected from that bucket. There may be no default association with any of the dynamic components.

It may be appreciated by one of ordinary skill in the art that although three buckets are illustrated, more buckets may be implemented. The layout of the generic e-mail is discussed with regard the HTML formatting tool module discussed below.

In order to dynamically generate the e-mail, the system matches a list of consumers with the filters included in the buckets. Depending upon which criteria included in the filters the consumers satisfy, the mailing is created using the dynamic components as laid out in the HTML formatting tool module. Additionally, as each dynamic component from the each bucket is selected, the system totals the rates so that the total amount of the package may be noted in the e-mail. Additionally, an offer code may be generated that is unique to the combination of dynamic components generated. The e-mail may further include an individual code identifying the particular consumer.

The e-mail may further include a URL where the consumer may access additional information relating to the promotion included in the e-mail. In order to make a purchase on the web page or by calling a designated number included within the postcard, the consumer may be provided with an offer code. Alternatively, if the purchase is done on the web, no offer code may need to be inputted as the consumer, as, upon clicking on the link or URL, the consumer may be sent to a web page with an offer corresponding to the offer code. Alternatively, if the consumer calls a designated number to complete his/her purchase, the consumer may be required to give the offer code to the operator who will know through the offer code what package the customer was offered. Each offer code is unique for each individual package, but different individuals may be supplied with the same offers and, therefore, the same offer code. The customer (i.e., e-mail recipient, facsimile recipient, postcard recipient, etc.) can call the user directly without operator or administrator intervention. Alternatively, there may be an offer code and an individual code included within each postcard or e-mail so that both the package, and the specific individual offered that package, will be able to be determined when the codes are produced for the reservation/purchase system by the user.

It may be appreciated by one of ordinary skill in the art that where the disclosure discusses formatting and sending an e-mail, alternatively, other forms of mailings may be generated, i.e., a facsimile, a hard copy for mailing through U.S. Postal Service, etc.

Alternatively, this dynamic e-mail capability may be used to generate automatic RFPs (Request for Proposals) from a supplier that has different profile elements that can be generated dynamically to buyers requesting proposals for such requested venues. For example, numerous providers, i.e., large hotel chains, have, in database 110, profile information relating to each of their properties. When Company A, i.e., JP Morgan, submits a RFP, in response to the RFP, the providers, using some of the features discussed herein, may dynamically generate a response to the RFP, in the form of an e-mail. This is accomplished by querying database 110 and accessing information responding to the requirements of the RFP.

HTML Formatting Tool Module

The HTML Formatting Tool module allows a user to create an entire email blast through an easy to use tool that provides to a user a page layout mode for creating any style of mailing format including images (i.e., gif and jpeg format), html text, and entire preconceived HTML uploads and including all Zmail component operations, including the modules discussed herein. The tool also includes a view page mode allowing for the precise placement of such content, and a preview page mode that allows for the previewing of how the actual email will look when it is delivered. The predictive nature is to give the user an easy to use/intuitive tool (much like Microsoft Word® is to creating letters) to a novice user for the creation of HTML email messages that give them 98% of free form screen painter (dealing with HTML limitations) yet formatting the layout of the HTML email message automatically so that it prevents any type of conflict from being created (typical for most free form tools) and allows the user to design, create and send the email with minimal editing challenges. The same interface for the creation of the HTML email messages is used to create all of the web pages, event driven pages, referral pages, and sweepstakes operations that play out as additional components for use within the system platform.

Figure 4A:
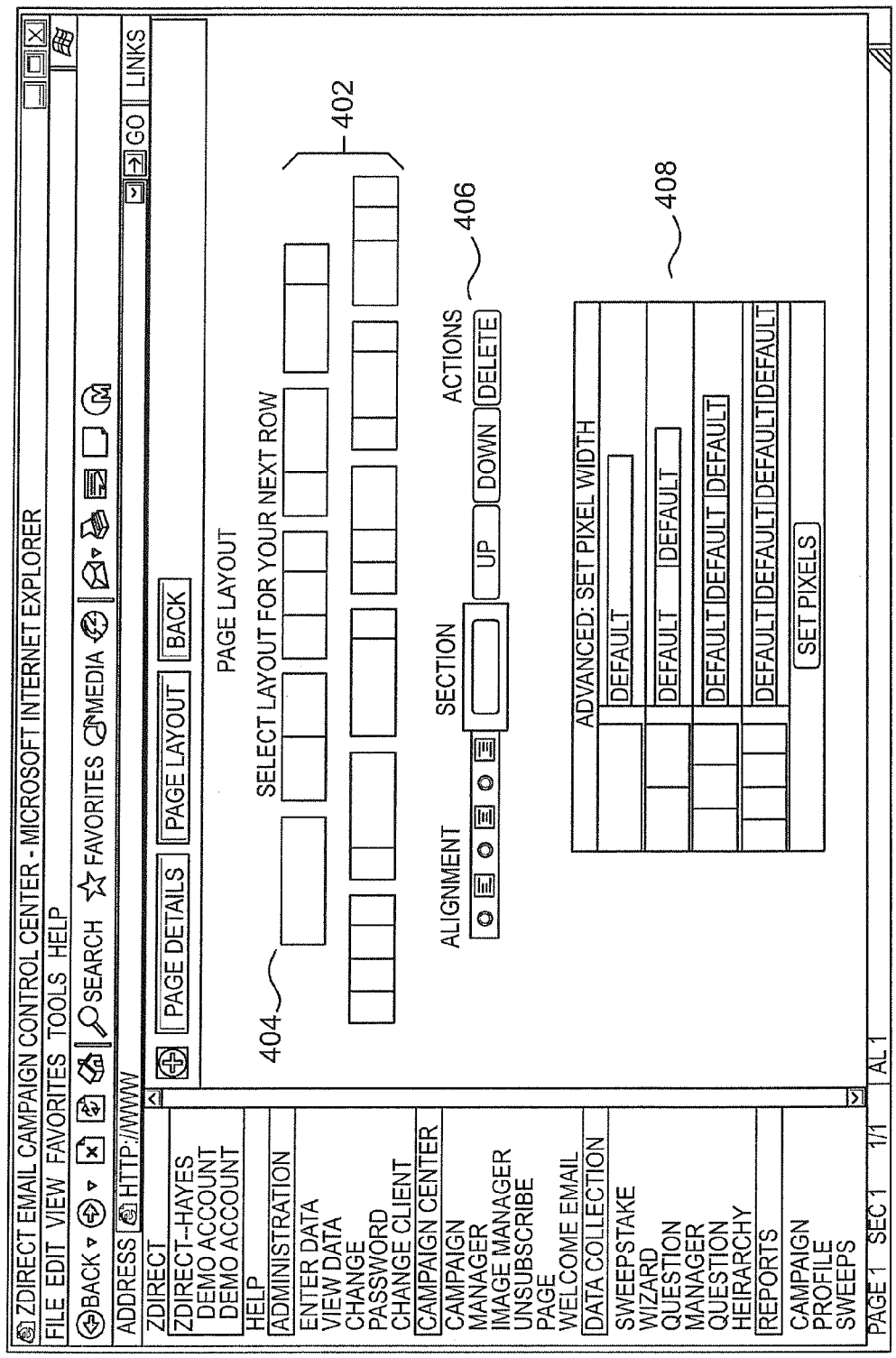
FIGS. 4A-4I depict exemplary screen displays presented to a user for generating mailing content, consistent with the principles of some embodiments of the present invention.

Using the HTML formatting module, a user may create a layout of the generic mailing. FIGS. 4A-4I depict exemplary screen diagrams presented to a user for facilitating the generation of a content or generic e-mail. As shown in FIG. 4A, the user may build the layout of the mailing from the top down. This layout may identify where the user wishes to have certain content placed in the generic mailing. The user may select from the line options 402. As shown in FIG. 4A, the user has selected the first line using option 404. Section 406 provides the user with the line options he has selected. For example, the user has the option to right, center, or left align section. Additionally, the user may move the line up or down on the page layout. Additionally, the user may delete the line. Advanced options 408 provide the user with the ability to set additional formatting, for example, pixel width, for each of the line options selected.

Figure 4B:
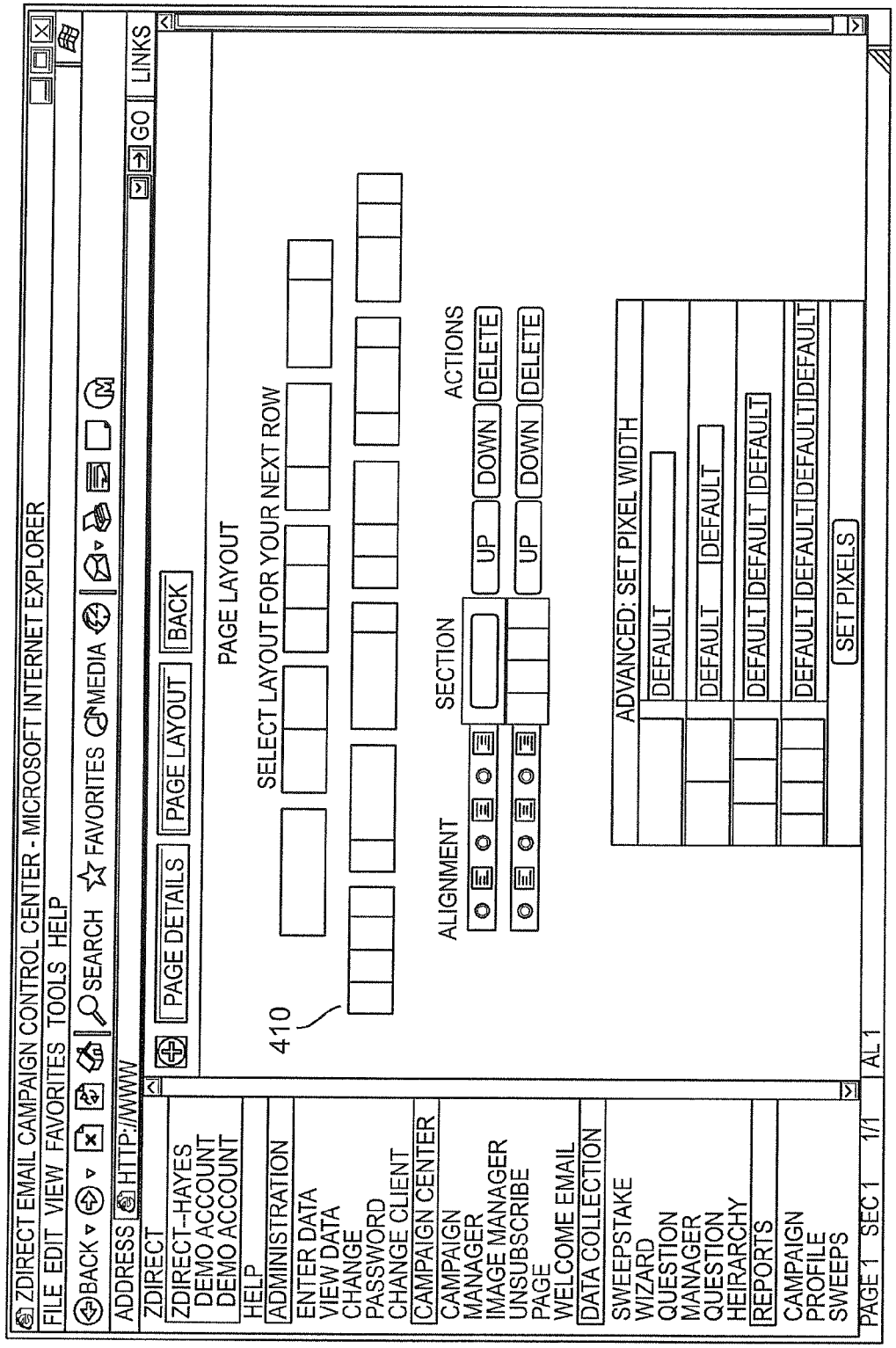
Figure 4C:
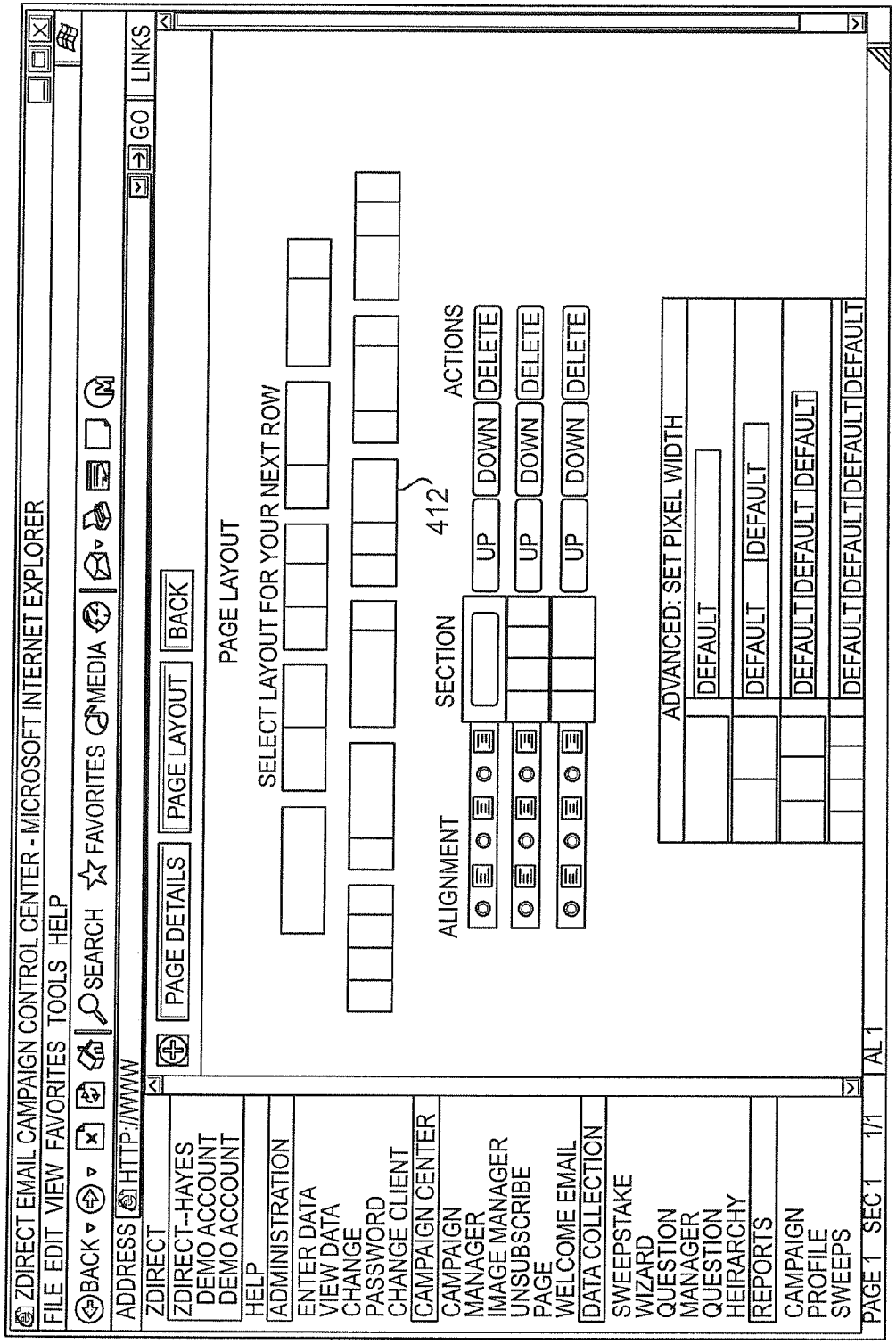
Figure 4D:
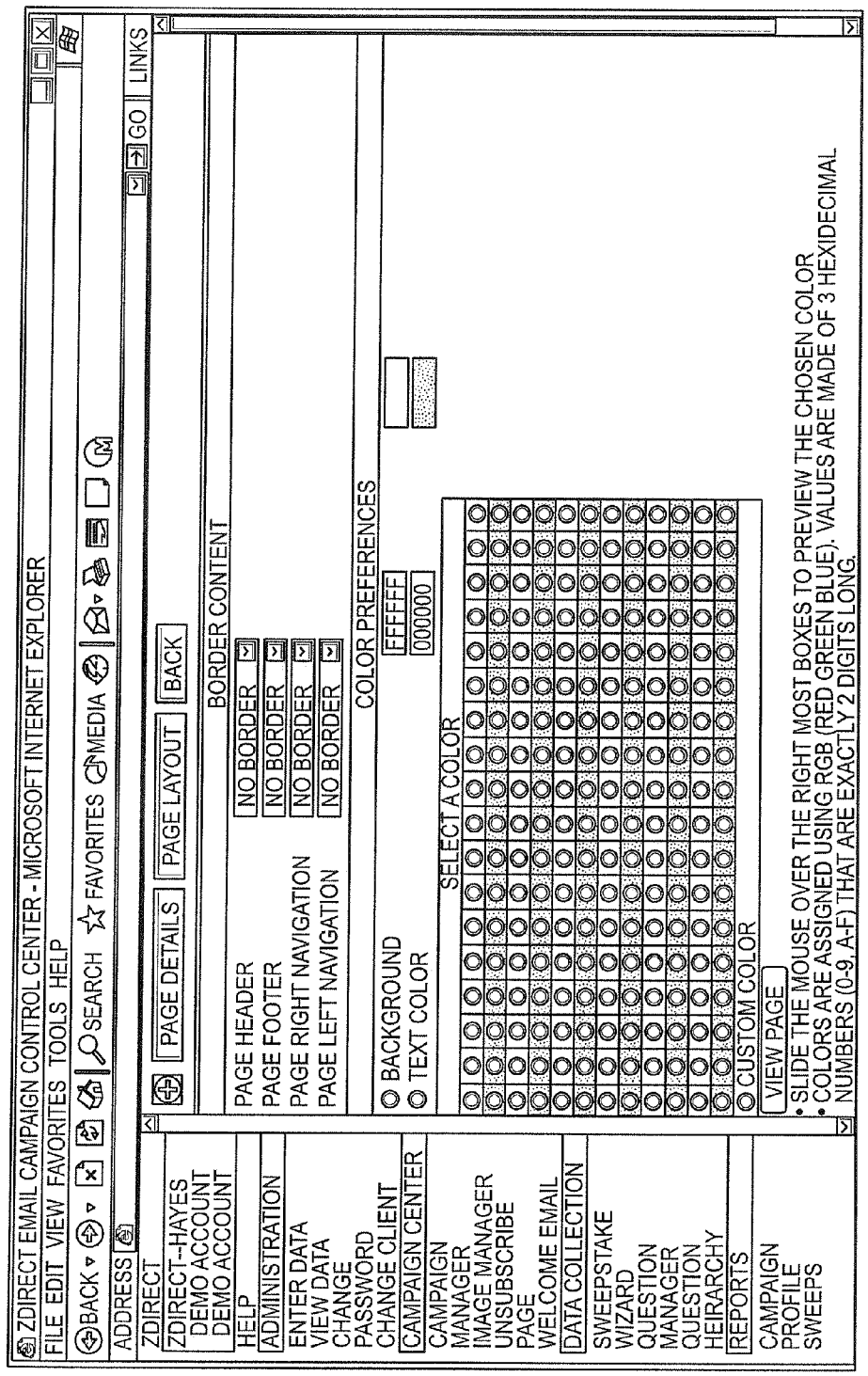
Figure 4E:
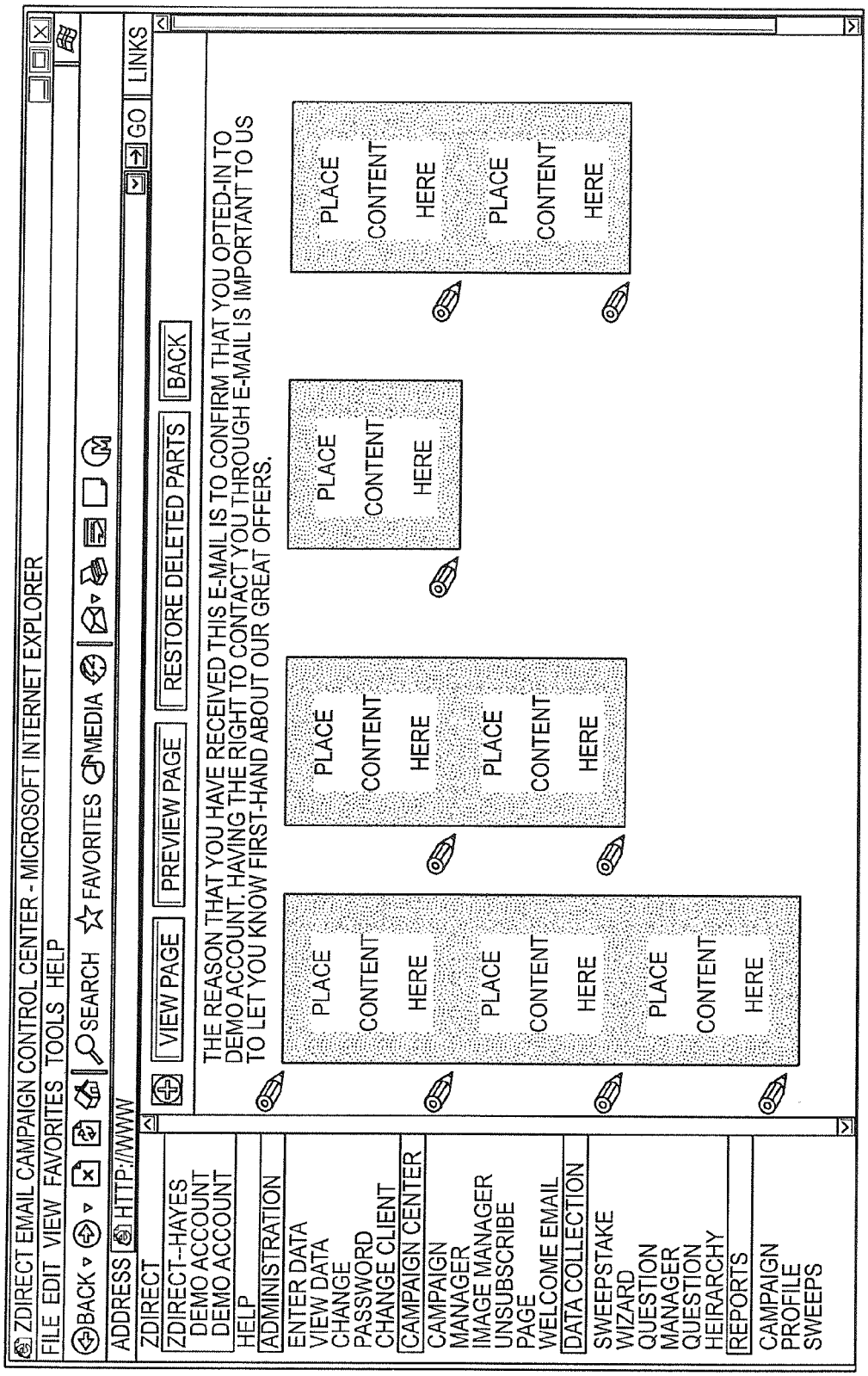
Figure 4F:
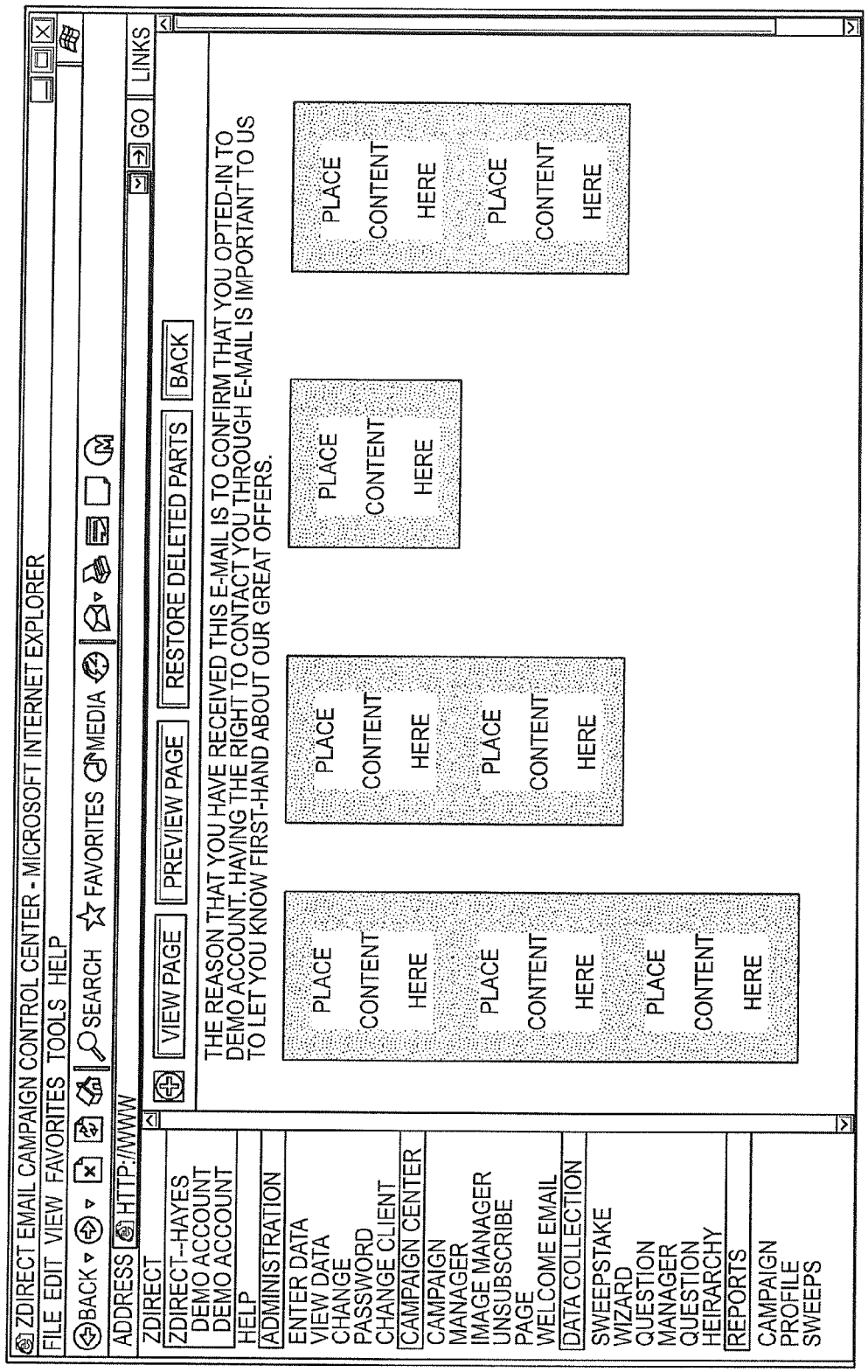

As depicted in FIG. 4B, the user has selected line option 410 as the second line in the generic e-mail. As depicted in FIG. 4C, the user has selected line option 412 as the third line in the generic e-mail. FIG. 4D allows the user to add border content using the drop-down menus. The user may additionally select colors for the background and text. Upon selection of the View page button, the user is presented with the exemplary screen display depicted in FIG. 4E. The pencils shown in the figure help the user to determine each of the dynamic components included in the generic e-mail. Upon selecting the Preview page button, the user may preview what the created mailing looks like upon exiting the HTML Formatter module as depicted in FIG. 4F.

Figure 4G:
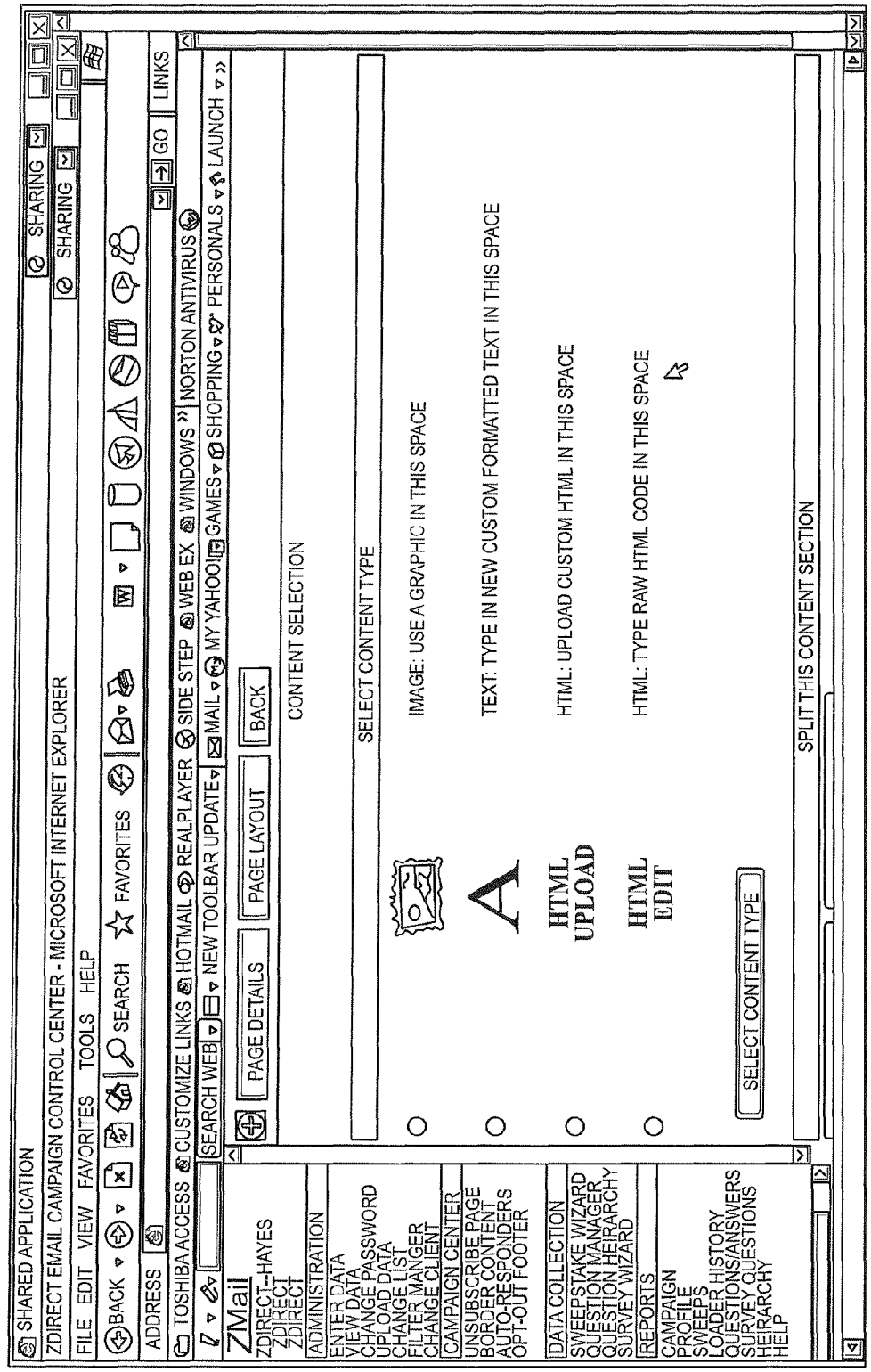
Figure 4H:
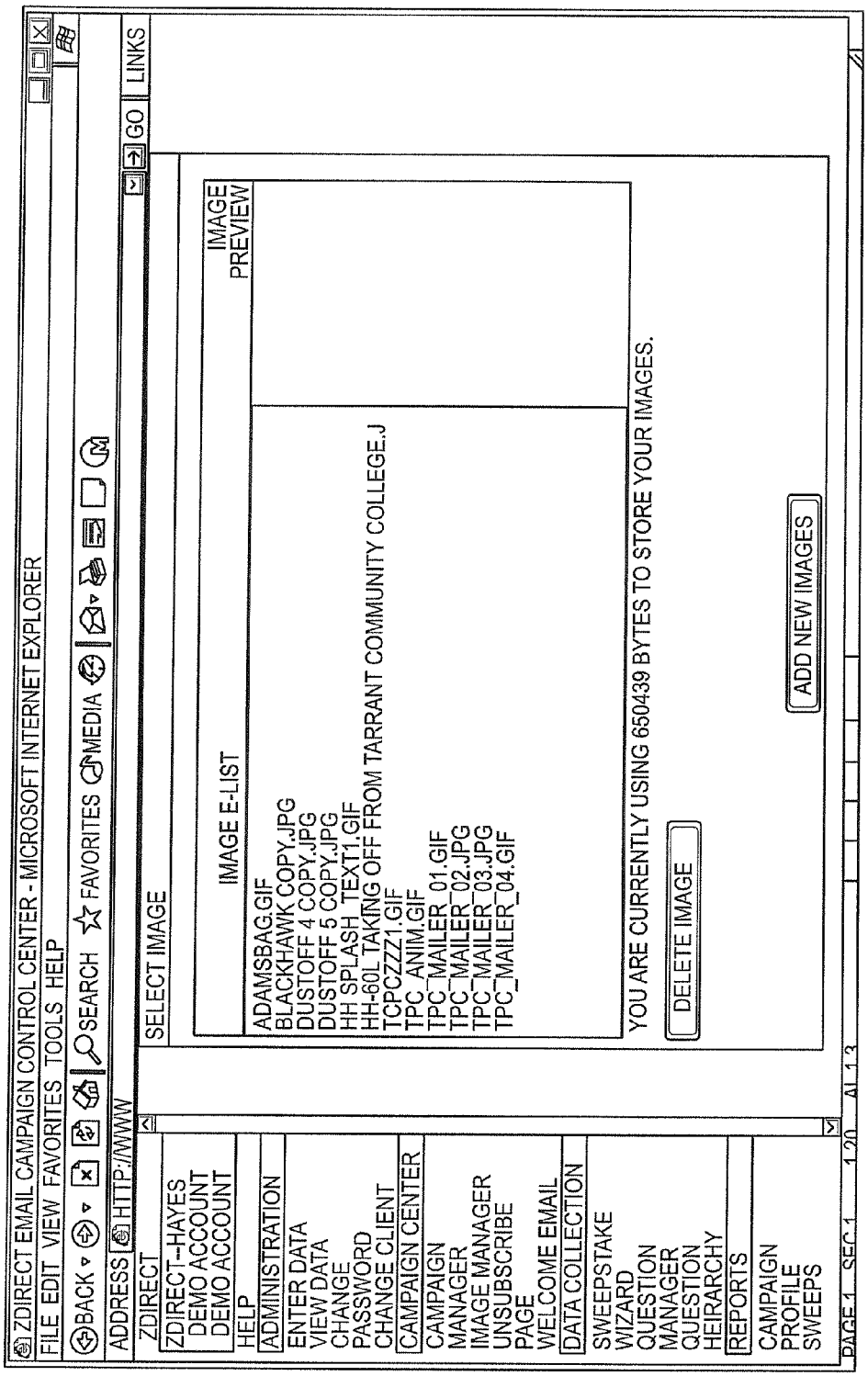
Figure 4I:
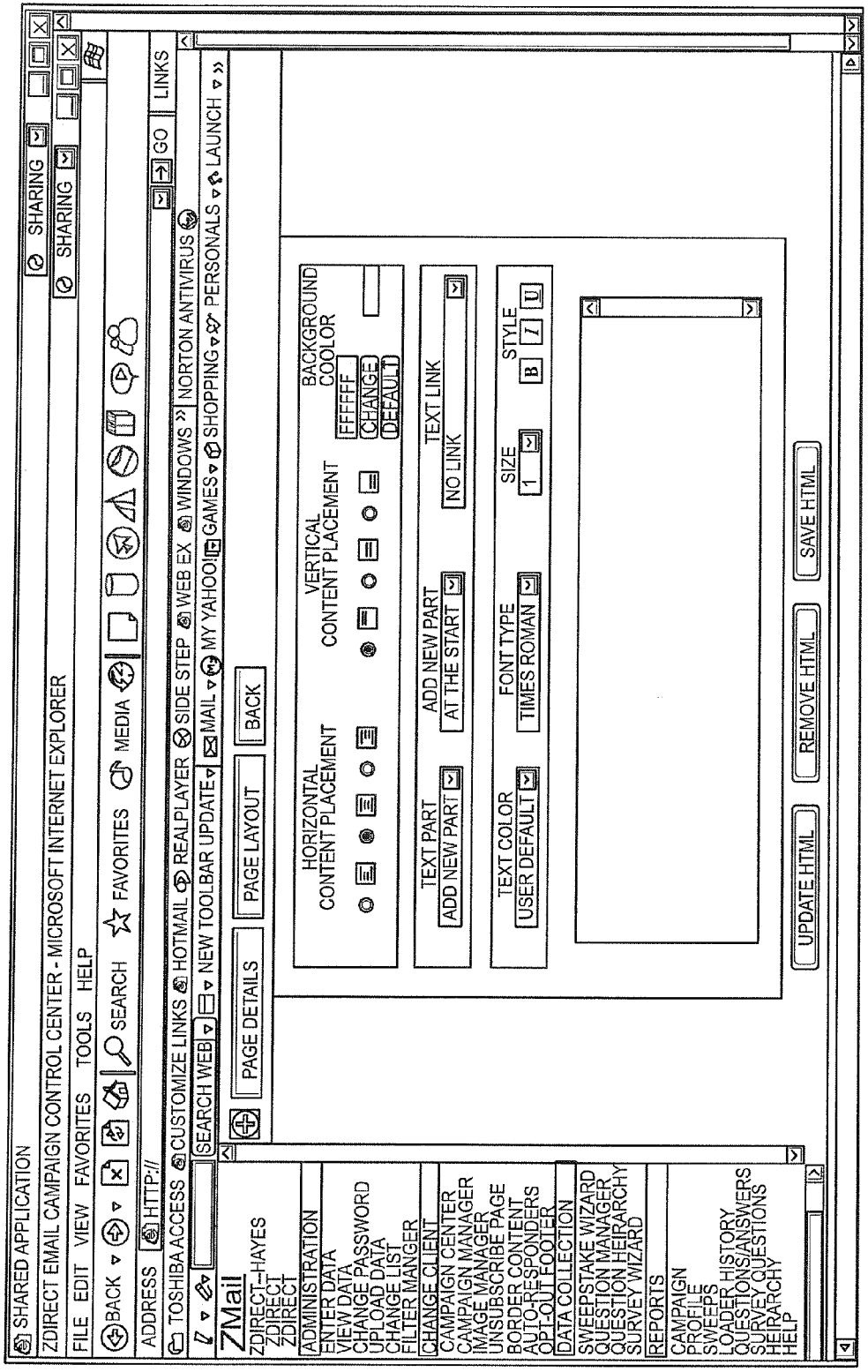

Once the user has created the page layout, the user may load images and/or text to fill each of the components created in the generic e-mail. FIG. 4G depicts an exemplary screen display presented to the user to identify what type of content the user wishes to insert in the areas he has established in FIGS. 4A-4C. As can be seen in FIG. 4G, the user may select to insert a graphic, custom formatted text, uploaded HTML, raw HTML, etc. If the user selects to insert a graphic, the user may be presented with an exemplary screen display as depicted in FIG. 4H. FIG. 4H depicts a list of the images that are stored in the system that the user may select from. The user may select from the stored list, load additional images for storage at server 108, add text to fill the components of the generic e-mail, etc. Additionally, the user may select to type in raw HTML using the HTML editing tool, an example of which is depicted in FIG. 4I. As can be seen in FIG. 4I, the user may select the justification of the text, the vertical positioning of the text, the background color of the area, format font size, color, etc., and additionally may insert links within the area. It may be appreciated by one of ordinary skill in the art that the HTML editing tool may be utilized to format many different aspects of the text to be inserted known to one skilled in the art and the disclosure herein should not be construed as limiting the scope of the functionality of the tool.

A feature of the HTML formatting tool is that it allows a user to create an e-mail that includes multiple-parts where each part can be built using different tools. For example, as depicted in FIG. 4C, the user may identify multiple areas in a mailing for different pieces of content. Each piece of content may be utilized for different purposes, i.e., a sweepstakes area, an offer area, a refer-a-friend area wherein if the consumer refers a friend to opt-in, the user may receive additional sweepstakes entries, etc. Further, as depicted in FIG. 4G, each of these areas may be formatted using different tools and different types of content, i.e., text, graphics, etc.

It may be appreciated by one of ordinary skill in the art that the user may use alternate methods for editing different characteristics of content, including, font, size, color, appearance, etc.

Dynamic Data Profiling System Module

The dynamic data profiling system module may be built out of an incentive sweepstakes system that is designed to earn the interest of an opt-in recipient enough to answer a limited number, i.e., four, of quick questions. By answering these limited number of questions, this allows the opt-in recipient (or commonly referred to "recipient" or the "consumer" herein) to earn an unlimited number of entries to win the sweepstakes incentive. The dynamic data profiling system provides new questions, i.e., four, every time that the opt-in recipient wants to re-enter the sweepstakes.

The profiling system is built on the platform that the sweepstakes provider has an easy manner in which to enter free form processed based questions of any type, and also creating predictive answer results that are known to the provider. However, by having the opt-in recipient answer that question, the predictive answer result leads to the creation of a rich profile built on the recipient leading the provider to fully understand what motivates that particular customer to their service or product. The questioning system is further supported by a question hierarchy system that allows for the prioritization of such question and the predictiveness of what tract of questioning patterns to present to the opt-in recipient based on answers to previously answered questions. For example, the question might be asked, "Do you play golf?" If the answer is "yes" to the question, then a tract of predefined golf questions are then subsequently asked. If the answer is "no", then the questioning proceeds to another branch that includes questions related to other possible interests of the recipient, non-golf related, to further understand what that particular interests of the recipient may be, for example, "do you like to play tennis."

A feature of the question hierarchy implementation is an extremely easy to understand user interface that combines the concept of using binary trees, with an intuitive use of all Boolean operators to create an entire circle of questioning patterns that does not lead the opt-in recipient into a "dead end" of a certain questioning tract. The Boolean system allows for the creating a "bridges" or "branches" into other predefined questioning tracts constantly building a rich profile on the changing interests of the opt-in recipient.

The dynamic data profiling system module may be the heart of the opt-in commerce system whereby a consumer may view a sweepstakes opportunity on, for example, a web site. In order to the enter the sweepstakes, the consumer must provide their name and contact information, in addition to answering a limited number of questions, i.e., four. The consumer has the ability to enter the sweepstakes any number of times. However, each time the consumer enters the sweepstakes a limited number of new questions may be presented to the consumer. The questions that are presented to the consumer may be based on prior answers provided by the consumer. This may be accomplished through the use of database 110 or a cookie look-up. For example, as the consumer enters their identifying information, i.e., their name, e-mail address, etc., the database may be queried to determine what questions, if any, have been previously asked to the consumer. Alternatively, this information may be obtained through a cookie-look-up. Based on the result of the determination, additional questions are presented based upon prior answers provided by the consumer. As the consumer answers each of these questions, the answers are associated with that consumer and may be stored in a database. Each additional time the consumer enters the sweepstakes, more new questions are presented to the consumer, thereby creating a rich profile including information about the consumer. These answers may be used in determining what custom mailings and which dynamic components may be included in an e-mail that may be sent to the consumer at a later time.

It may be appreciated that additional information may be obtained from different sources. For example, where the consumer has completed any survey that may be associated with any users, or service providers located on network 106, the answers may be stored in database 110 and used for determining additional custom mailings.

Additionally, the consumer has the ability to submit referral information referring the sweepstakes sponsors to the referred consumer. By providing valid referred consumer, i.e., valid e-mail or snail mail addresses, the consumer who provided the referrals may benefit by receiving additional entries to the sweepstakes, i.e., 20 entries. This provides incentive for the consumers to provide valid referrals and, at the same time, provides the sweepstakes sponsors with additional consumers to load into their database. With each valid referral, new consumers are added to the database. As each new consumer enters the sweepstakes, the new consumer answers the questions posed and the answers to the questions are stored, thereby creating a rich profile for the new consumers.

The questions are created by the user through application software 208 while accessing server 108. Depending upon the type of organization the user represents, the user may create questions that are directed to those particular services that the user's organization offers. For example if the user is a hotel, then the user may provide questions that are directed to services offered by the hotel. These questions may include: "How often would you like to hear from us?"; "Do you play golf?"; "What time of the year do you like to travel"; etc. By asking how often the consumer would like to hear from the user, the user may offer tempting offers without trying the consumer's patience. Additionally, by providing offers that target the consumer's interests, the consumer is more likely to read and consider the offer by the user. The custom mailing is an offer that the consumer would likely be interested in based upon previously cited interests.

The questions may be presented to the consumer where the consumer would provide a single or multiple answer, i.e., "What month do you like to visit Florida?", or "What months do you like to visit South Carolina?". This allows the system to anticipate the next round of questions based upon the answers provided by the consumer. For example, if the consumer indicated that he plays golf, the subsequent questions may include additional information regarding the consumer's interests in golf. If the consumer indicates that he is not interested in playing golf, no additional questions regarding golf are presented to the consumer. Once the consumer indicates that he does not play golf, additional questions may be presented to the consumer to ascertain what the interests of the consumer are. For example, "Do you play tennis?"; "Do you enjoy the theater?"; "Do you enjoy spas?", etc. By providing a processed-based questions with predictive answer results, a rich profile of the consumer may be created. This profile may be utilized to ascertain which custom mailings the consumer may receive in the future. Additionally, the consumer may be presented with a question such as "How often would you like to hear from us?". This provides useful information in that the consumer may not be saturated with offers that he is not interested in. If the consumer indicates that he would only like to hear from server 108 3 times per year, only 3 e-mails including information relating to promotions may be sent.

The dynamic data profiling system module may further provide open-ended questions to the consumer. For example, if the consumer cancels a reservation, this module may provide the user the ability to generate a questionnaire to be presented to the consumer that includes open-ended questions. These comments may be stored at server 108 where the user may read and consider the consumer's comments. These comments may be searchable so that the user may locate all comments, for example, that include the words "poor service", etc.

It may be appreciated that value added reseller server 112 may assist the user in creating questions in such a manner that the consumer's interest may be acquired more efficiently by selecting which questions are presented to the consumer and when As these questions are presented to and answered by the consumer, a rich profile is created including information relating to demographic, lifestyle, geographic, purchase information, etc. The information is stored in a database and is accessed and is used to determine what offers should be presented to the consumer.

In addition to the above functionality, the system allows for integration of third party data by determining how prospective consumers or recipients are identified based upon their stored preferences. The system then enables mapping or association from one classification of preferences to a newly created classification of preferences in order to more efficiently enable the application of filters. For example, the user wants to create a question that asks what the preferred length of stay of a consumer is, and provides three possible answers as follows: "1 week", "2 weeks", and "more than 2 weeks." However, the database stores preferences for consumers in a "day" unit. As such, a mapping may be created that accesses the prospective consumer or recipient list and maps the stored "day" information to one of the three possible answers. Thus, a consumer who previously indicated that he like to stay 8 days would be mapped to the "2 weeks" category.

Resource Optimization Module

Through the delivery of a mailing, a system is created by which the consumer is lured back to a web site based on the ability to receive a comparable offer promoted through the original mailing and tracking the click-through back to the web site from the mailing. This may be accomplished by providing a URL or link to a web site that includes additional information regarding the promotion in the mailing and/or information regarding alternative promotions. The system may track all of the link click-throughs on the web site building a temporary inferred profile. If the consumer does not make a purchase event through the web site visit, then an additional mailing may then be dynamically generated and sent back to them displaying a similar package based on their inferred profile" or click-through interest with some type of additional incentive to purchase. The consumer's inferred profile may be additionally stored in database 110.

Thus, the system, consistent with principles of some embodiments of the present invention, provides for additionally storing inferred profiles. These inferred profiles are generated by tracking the click-throughs on the web site. For example, if the consumer, in accessing the web site, accessed information about golf packages and spas, the system may store this information in an inferred profile. If the consumer does not take advantage of the promotion in the mailing, the system may generate additional marketing materials based on the inferred profile. For example, the system may access promotions that are related to golf and the spa and generate a dynamic mailing offering additional packages related to golf and the spa.

Figure 5:
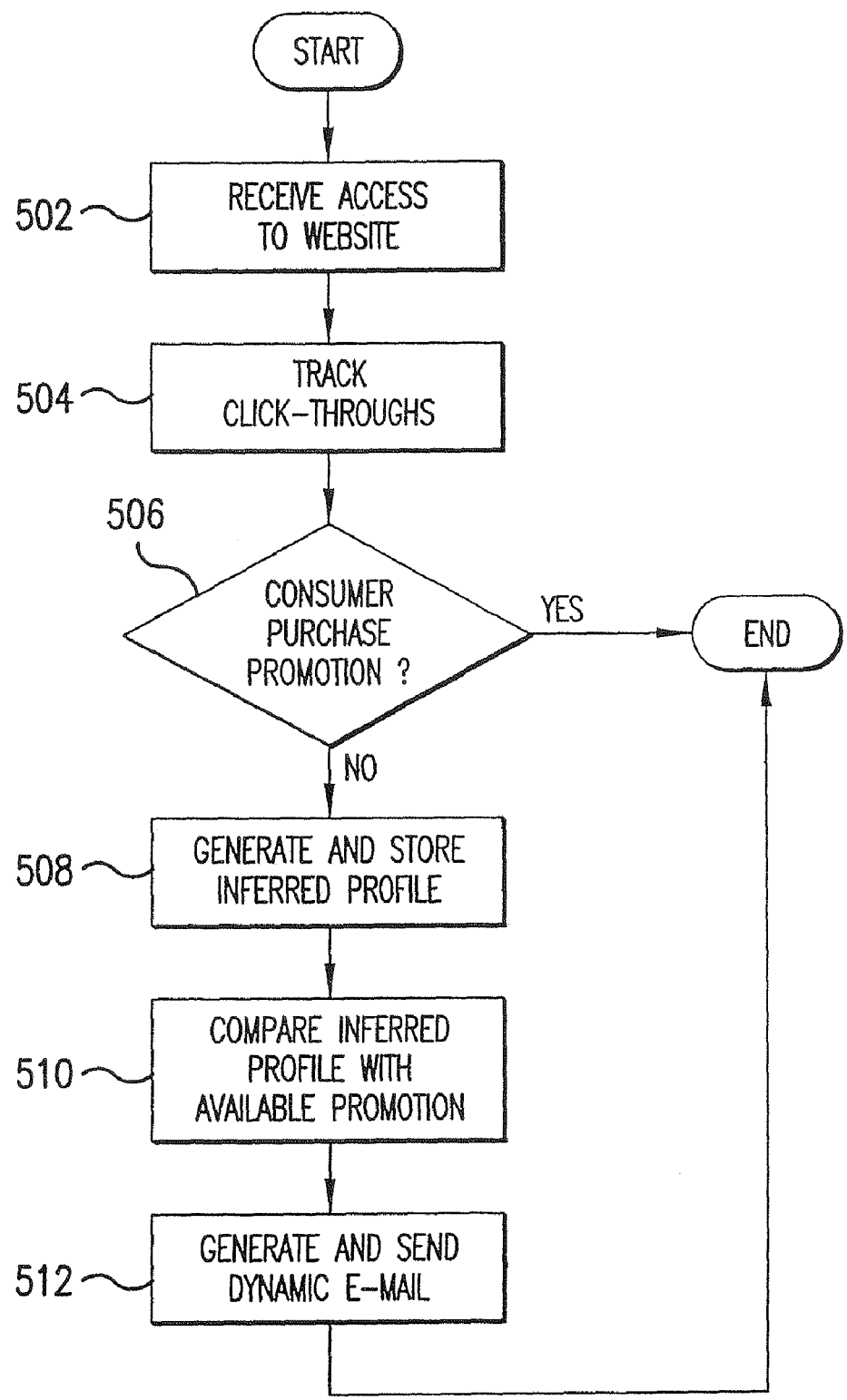
FIG. 5 depicts an exemplary flow diagram of a process performed by server computer in utilizing inferred profiles to create dynamic mailings, consistent with principles of some embodiments of the present invention.

FIG. 5 depicts an exemplary flow diagram of the process performed by server computer 108 in utilizing inferred profiles to create dynamic e-mails. As shown in FIG. 5, server 108 receives information that a consumer is accessing promotional information in accordance with information received from a previous promotional mailing (Step 502). As the consumer clicks through the web site, server 108 tracks and stores the consumer's click-throughs (Step 504). After the consumer has left the web site, server 108 determines whether or not the consumer purchased anything related to the promotional information (Step 506). If the consumer made a purchase (Step 506, Yes), processing ends and no further e-mail may be sent at that time. If the consumer did not make any purchase (Step 506, No), server 108 generates and stores inferred profile information (Step 508). This inferred profile information may include any type of information the consumer accessed while browsing the web site Sever 108 may then compare the inferred profile information with any available promotions (Step 510). For example, if the consumer was accessing golf packages, the system may search for any available golf promotions and include one or more golf promotions in the next promotion. If there are available promotions based upon the inferred profile, the system may generate and send a dynamic e-mail including the new promotions based upon the inferred profile (Step 512). Alternatively, an e-mail may be send to the consumer upon a consumer's action, i.e., access of a certain web page. For example, if a user accesses a web page including technical specifications for a vehicle, an e-mail may be generated including an incentive or offer, i.e., offering the consumer incentive to contact the local vehicle dealer for a discount on a purchase.

Dynamic Integration Module

The system, consistent with principles of some embodiments of the present invention, is designed to interface into existing third party applications through SQL procedural calls, API (application programming interface) integration or automated batch mode file export/import techniques that transfers appropriate data from the third party system into the system for further segmentation and/or targeted e-mail delivery based on certain events or triggers. For example, a user may query the system for all consumers who booked a particular type of package last year in a consumer history file and based on when they came last year, send the consumer another e-mail this year, 45 days before a year from their last visit, and offer them the same package with an additional incentive while considering their stored dynamically profiled information.

Additionally, the incentive to come back again on the same package may be based on a dynamically created incentive based on a profile interest stored in the Zmail database 110. The system is further supported by creating dynamically generated emails based on such events and triggers using calendar seasonality of current events/offerings and/or profile interests. For example, a welcome e-mail can be generated to the consumer 7 days before they arrive on a vacation package reconfirming their particulars and also advising the consumer of the current events happening in the area of the vacation location and/or promoting certain attractions to the recipient based on the profile interests of the recipient stored in the system. For example, if the consumer's profile indicates they enjoy Italian food, golf and theater, the e-mail may promote a new golf course relationship, a great Italian restaurant relationship, and the a certain theater show relationship established by the initial provider. The welcome e-mail may additionally include links to each of these promoted venues to place reservations, provide purchase opportunities, etc. Additionally, the welcome e-mail may promote certain activities relating to the appropriate season. For example, if the consumer is vacationing during the summer, the welcome e-mail may include promotional information relating to water sports. However, if the consumer is visiting in the winter, the welcome e-mail may promote snow sports.

It may be appreciated by one of ordinary skill in the art that information may be obtained from other web sites and included in the welcome e-mail. For example, the Chamber of Commerce of the town where the hotel is located at may include a list of current events. This information may be automatically acquired from certain web sites and stored in database 110. At the time the welcome e-mail is generated, the date period and location may be searched and whatever events are stored may be inserted into the welcome e-mail to advise the consumer of the current events in the town during the time period the consumer is visiting.

List Broker Management Module

The list broker management module, creates an incentive opt-in registration system on a web site that uses the dynamic profiling system to turn anonymous web site visitors into well-profiled recipients either through further email correspondence using the profiling/targeting technology, or web site inferred profile. The module further builds a consumer's inferred profile based on click-throughs after opt-in registration to create profile reports available to the general public to access and generate list rental requests providing list broker revenue for the web site owner. The system may further be supported by the ability to offer the general public to access the tools discussed herein to build the desired email blast, which may include the act of sending out a set of dynamically generated e-mails, sending out a fully created e-mail under the web site owner's account and matching the e-mail blast against a desired list rental offered by the web site owner. Additionally, if the list rental prospect is a current client or user and wants to run a desired e-mail blast against a list rental from a user's own web site, then the list rental prospect would be able to request a certain unique access code from the web site owner that, when matched against the e-mail blast, automatically segments the desired list rental from the web site owner's account on the server and creates a temporary push list or filter that is then matched to the list rental prospect's desired e-mail blast built using their own user's account, complete with all components discussed herein, such as incentive opt-in data profiling, interest and incentive level viral referrals (refer-a-friend), etc., to receive the extra added benefits of the system.

For example, a local television station may maintain a list of consumers that have opted into receiving dynamically generated emails or single filter e-mails through a sweepstakes as discussed above. The television station may learn that a local car dealership may have a promotion for discounts on new cars. The television station may, in conjunction with the local car dealer, look to promote a certain marketing event at the car dealership. The television station may, as a list broker, dynamically generate e-mails, and, using the television station's consumer list, send out the dynamically generated e-mail to their consumer list including the promotion from the local car dealer. In this instance, although the e-mail is being sent from the television station, the content of the e-mail promotes an event at the local car dealership. The e-mail may include a link to the car dealership that includes information regarding the marketing event. This e-mail may include filters that only send the e-mail to consumers who satisfy certain requirements using filters, i.e., consumers who have shown interest within the past 3 months.

Efficiency of Delivery Module

The efficiency of delivery module assists in creating e-mails that may not be blocked by spam filters. Once a dynamic e-mail is generated, the e-mail is sent through a simulated spam filter, i.e., SPAM Assassin®, where the e-mail is evaluated to determine if the e-mail would be blocked from being sent. Once the e-mail is evaluated, a report is generated that indicates any content in the e-mail that may prevent the e-mail from be successfully sent. Additionally, the efficiency of delivery module provides an overall score of the e-mail. If the score is more than a predetermined amount, the system indicates to the user that the e-mail would likely be blocked. Using the information in the report, the user may change the text in the e-mail and resubmit the e-mail to the simulated spam filter to determine if the corrected e-mail would likely be blocked.

Figure 6:
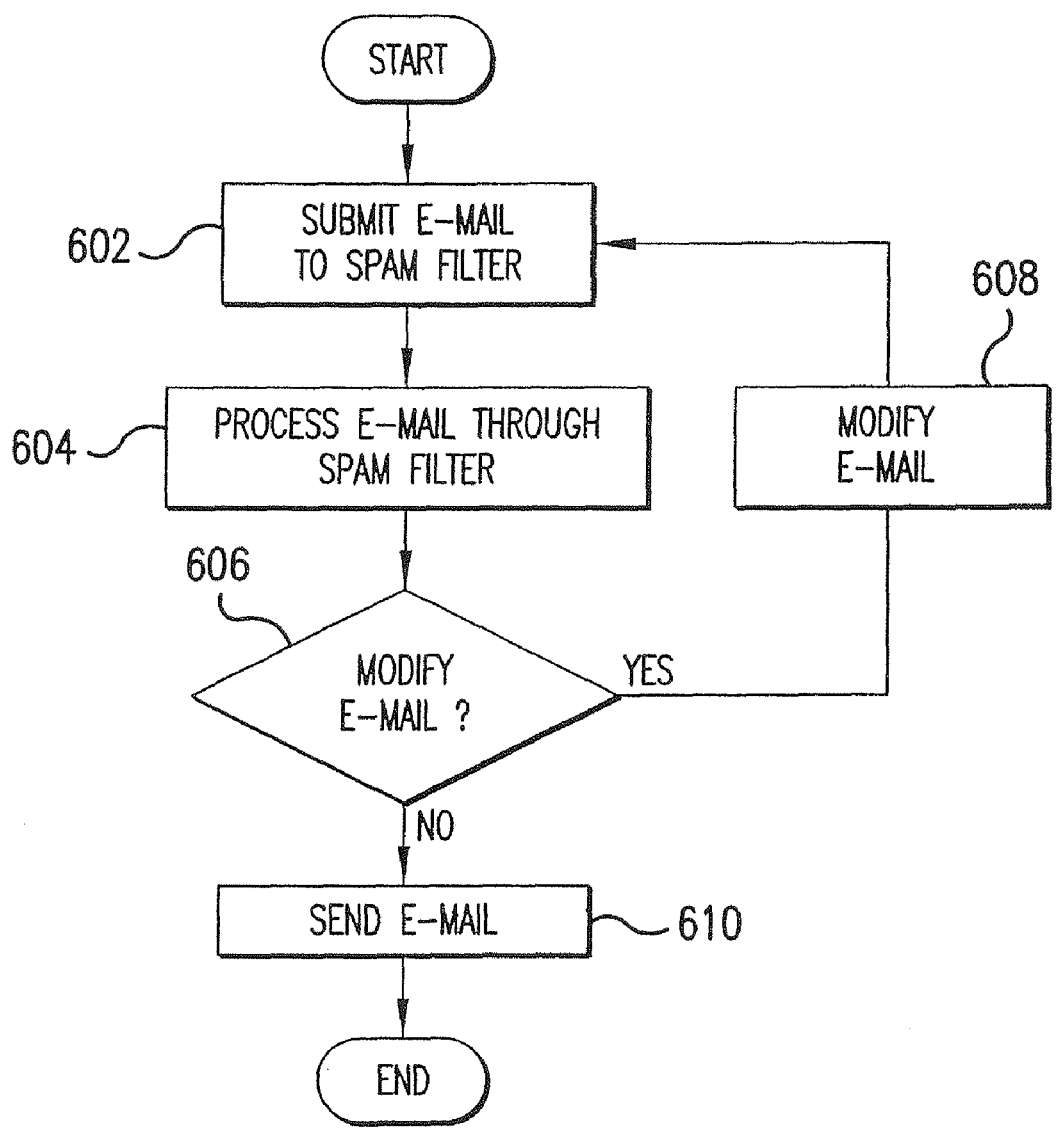
FIG. 6 depicts an exemplary flow diagram of a process performed by server computer in processing mailings through a spam filter, consistent with principles of some embodiments of the present invention.

FIG. 6 depicts an exemplary flow diagram of the process performed by the server computer 108 in processing mailings through a spam filter. For example, upon generating the dynamically created e-mail the user may submit the e-mail through a spam filter (Step 602). Upon receipt of the e-mail at the spam filter, the system processes the e-mail to determine if the e-mail is likely to be blocked based upon its content (Step 604). Upon completion of the processing, the system generates a report that specifically identifies any content that the spam filter identifies as objectionable. For example, the report may include a notation that the e-mail included three recitations of the word "Free," or the font included in the e-mail is red. The system further generates an overall score of the e-mail. For example, the system may determine that, based upon the content of the e-mail, the e-mail scored a 7.9 where any score over, for example, 7.5, will be blocked by the spam filter. The system then determines whether the e-mail should be modified based upon the score given (Step 606). For example, as 7.9 is greater than 7.5, the e-mail would likely be blocked. If the system determines that the e-mail should be modified, the system allows the user to modify the e-mail based on the indications in the report provided to the user (Step 606, Yes). The e-mail may then be modified (Step 608), and processing proceeds to Step 602. If the system determines that the e-mail does not need modifying, (Step 606, No), then the e-mail may be sent (Step 610).

Alternatively, the e-mail may be modified automatically depending upon the type of correction. For example, if the system determines that the e-mail needs to be modified, the system may utilize the information included in the report to attempt to reduce the e-mail's score. For example, if system determines there is red font, the system may automatically change the font to green, thus reducing the score. Additionally, the system may automatically change objectionable text in the e-mail to acceptable text. The system may then automatically re-submit the e-mail to the spam filter where processing returns to Step 602.

Additionally, the efficiency of delivery module reviews and tests the e-mail to provide for efficiency of delivery. For example, the efficiency of delivery module tests the links included in the e-mail to ensure they are valid links. If the links are not valid, an error message will be presented to the user. The efficiency of delivery module may further test to see if there is any obscene information in the e-mail and provide an error message to the user, the user's supervisor, or both.

Additionally, the efficiency of delivery module may provide for multiple log-ins for users in order to ensure that only certain users have the ability to send out the dynamically generated e-mails. For example, lower level users may only have the ability to create dynamic components, filters, etc., while the lower level users may not be able to actually send out the e-mail. This prevents the situation where inappropriate e-mails are being out Should an inappropriate e-mail be sent, this may create a situation where the opt-in customers interest is tainted by receiving an inappropriate e-mail. By providing for multiple level log-ins, users may only access those features of the system to which they have permission.

Additionally, the system evaluates all e-mails that are sent in an effort to ensure that a proper e-mail is being sent. For example, immediately prior to sending an e-mail, the e-mail may be processed through an internal spam filter, i.e., similar to the filter discussed above, in an attempt to identify inappropriate content. The system may further include predetermined thresholds. The inappropriate content identified during the processing through the spam filter may be compared with the predetermined thresholds in order to determine if the e-mail may be sent. If the content exceeds the predetermined thresholds, the e-mail may not be sent.

Load Balancer Module

The load balancer module operates by automatically generating regular or dynamic content e-mails which are automatically created and delivered based on the interface into an existing third party application that achieves a certain amount of desired revenue production based on the capacity to support the availably of such product, service, or inventory component.

Where the user's organization is a hotel, the load balancer module may store information regarding the bookings per number of e-mails sent. For example, the system may store statistical information that, for example, in previous mailings, based upon 10,000 e-mails sent, the hotel booked 20% of their rooms. This information may be utilized in ensuring optimal bookings. For example, upon reviewing the vacancy for the month of February, the user may note there is a 20% vacancy, where only a 10% vacancy is desired. By accessing the load balancer module, the user may indicate a deficiency of 10%. Based upon the previously stored information, and a previously stored generic e-mail, the load balancer may send out, either automatically, or based on user assistance, a sufficient number of e-mails to attract consumers to fill the 10% deficiency. Alternatively, the system may conduct a random sampling using filters to attempt to fill the deficiency. If the whole deficiency is not filled, or the system may identifies a need for more bookings, then, using additional filters, another random sampling may be sent, excluding those from the first email blast.

The user may configure the system, i.e., to request a certain percentage occupancy rate depending upon the season, i.e., 80%, occupancy during their busiest season and 60% during their slowest season. Periodically, the load balancer module may query the user's database, i.e., database 118, to determine what the current vacancy rate is an adjust the dynamic e-mails being sent in an effort to attain the user's designated occupancy rate. This may be accomplished by varying the occupancy rate to approach and equal the designated occupancy rate as the designated season approaches. This may further be accomplished by interfacing into existing third party applications through SQL procedural calls, API (application programming interface) integration or automated batch mode file export/import techniques and query the appropriate data from the third party system for use in the ZMail system On-Line Booking Wizard Module The on-line booking wizard module facilitates the actual multiple bookings once a customer has accepted a promotion included in a mailing. For example, the consumer has received a mailing that promotes a hotel rate for a particular time period, a round of golf for a particular time period, and theater tickets for a particular show at a particular time. Using the on-line booking wizard module, the consumer may schedule each of these events at server 108 in one session. For example, upon accessing server 108, the consumer may provide a promotion code that is unique to the promotion included in the mailing. Upon accessing the on-line booking wizard module, the consumer may be prompted to enter information as to whether the consumer accepts the hotel promotion for the given dates and rates. If the consumer accepts the promotion, server 108 may access hotel server 116 and book a reservation in accordance with the terms in the promotion.

Further, the consumer may accept the golf promotion. Upon acceptance, server 108 may access Tlinks server 120 and schedule the golf round in accordance with the terms included in the promotion. Finally, upon acceptance of the theater promotion, server 108 may access ticketmaster server 122 and purchase theater tickets in accordance with the terms of the promotion included in the mailing. The consumer may additionally be required to provide billing information whereby bank server 114 may be accessed to facilitate the booking of the promotion.

It may be appreciated by one of ordinary skill that the on-line booking wizard module may allow the consumer to book alternative times, shows, etc., depending upon the consumer's wishes. For example, the consumer may not be interested in golf at 8:30 a.m. However, the on-line booking wizard may facilitate the booking of golf at 9:30 a.m.

In addition to the features discussed above, the dynamic e-mails that are created may further be sent to other users for modification and resending. Where a particular marketing promotion is being offered, the first user may direct the e-mail to a group of second users. The group of second users may revise the e-mail and forward the e-mail to consumers. For example, a hotel has a particular marketing promotion and sends the promotion to a group of travel agents. The hotel, as the first user, may generate a dynamic or a single filter e-mail and send the e-mail to the group of second users, a group of travel agents. The travel agents may then revise the e-mail, using the HTML formatting tool discussed herein. For example, the second user may add source information promoting the second user's travel agency. Alternatively, the second user may additional add further promotions and/or incentives to the e-mail. Once the modification process is completed, the user may establish the modified e-mail as the generic e-mail, create filters as discussed above, and send the e-mail to consumers. Alternatively, the second user may merely forward the e-mail to consumers without modifying any of the dynamic components in the e-mail.

Reporting

In addition to the features discussed above, the system has the ability to generate reports utilizing the data included in database 110. FIGS. 7A-7D depict exemplary reports provided to a user based upon information stored in the system. 7A depicts an exemplary report that identifies the number of YTD e-mailers within the past three months, the total number of registrations, the number of distinct people to register and the new e-mails received through the sweeps. FIG. 7B depicts and exemplary report that lists the questions that were provided by the user using the dynamic data profiling system module and the answers that were provided by consumers. FIG. 7C depicts a report that summarizes the consumers stored in the system by categorizing them into A lists, B lists, and C lists. For example, if a consumer has answered 4 questions and they were a previous guest, he may be categorized within the A list. If a consumer has answered 4 questions but that customer was not a previous guest, then he may be categorized within the B list. If the only information about the consumer within the system is an e-mail address, then the consumer may be categorized within the C list. As the consumer operates within the system, and as the profile of the consumer builds, he may move from the C list to the B list.

By generating this report, the results provide valuable information to a user as the user can identify which consumers are more likely to accept certain offers. This may direct a user's advertising and may reduce the amount a user spends on advertising. This may also be done by determining how many A list consumers have opened and clicked through e-mails i.e., acted on link in e-mail. This report may additionally be utilized as a trending report where the user may see how the list quality is growing.

It may be appreciated by one of ordinary skill in the art that the categories may be identified using different criteria. For example, an A+ category may be established whereby any consumer that has opened an e-mail and clicked through the links may fall within this category.

FIG. 7D depicts an exemplary return on investment (ROI) report and may provide information including the total sweepstakes registrants, the number of unique registrants, etc.

Additional Applications

Figure 8A:
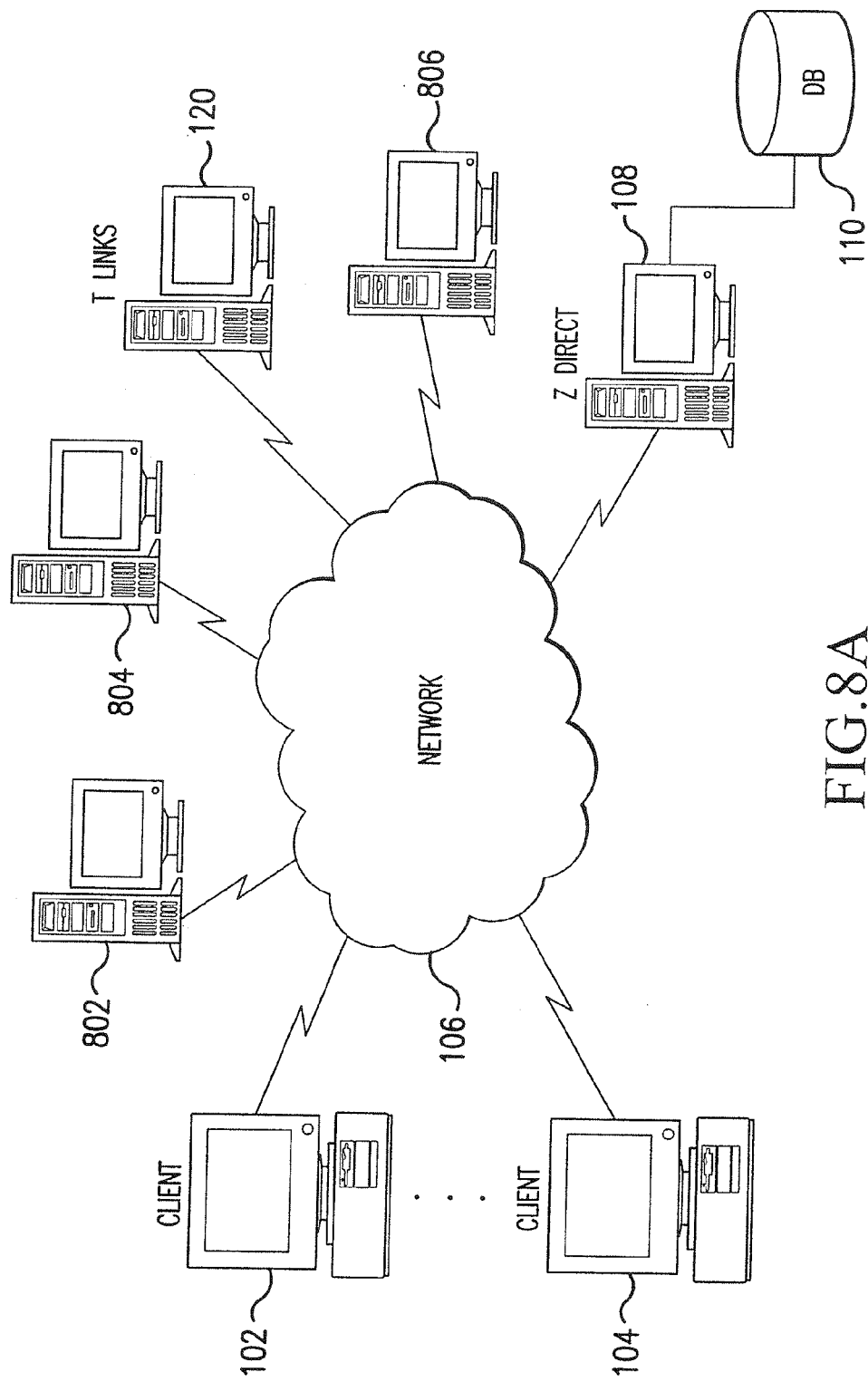
FIG. 8A depicts an exemplary system environment for implementing the features consistent with some embodiments of the present invention.

In addition the modules discussed therein, systems and methods consistent with the principles of the present invention provide for an $11^{th}$ hour tee time module. Consumers, utilizing the $11^{th}$ hour tee time module may schedule tee times at various locations throughout the United States at one location on the network. FIG. 8 depicts an exemplary system environment for implementing the features consistent with some embodiments of the present invention. As shown in FIG. 8A, servers 802, 804, and 806 reside on network 106 and represent, for example, Hotels.com, expedia.com, Hyatt.com, respectively. These servers may access Zdirect server 108 through network 106.

Consumers, through client device 102, may access servers 802, 804, and 806 through network 106. Upon access to server 802, for example, the consumer may look to book a hotel through the website offered at Hotels.com. Upon completion of the booking, the consumer may view an icon identifying 11$^{th}$ hour tee times. Upon selecting the icon, the consumer may then, through a hyperlink, be directed to server 108, where, through an interface provided at server 108, the consumer may view available tee times real time at various golf courses located, for example, near the hotel the consumer has just booked at Hotels.com. As the consumer is inquiring about tee times at server 108, server 108 accesses server 120 with the appropriate queries. Tlinks server 120 has access to other servers on network 106 that provide information regarding availability at golf courses throughout the United States. As such, the consumer may schedule tee times at server 108, where server 108 scheduled the tee times through server 120.

It may be appreciated that upon the scheduling of the tee times, the consumer may be required to enter billing information, where server 108 may access the consumer's financial institution to confirm payment.

It may further be appreciated that, as each consumer schedules a tee time at server 108 through the hyperlink provided at servers 802, 804, etc., a commission may be paid to the host of servers 802, 804, etc., as the consumer was directed to the 11$^{th}$ hour tee time site based upon the "referral" at servers 802, 804, etc.

Figure 8B:
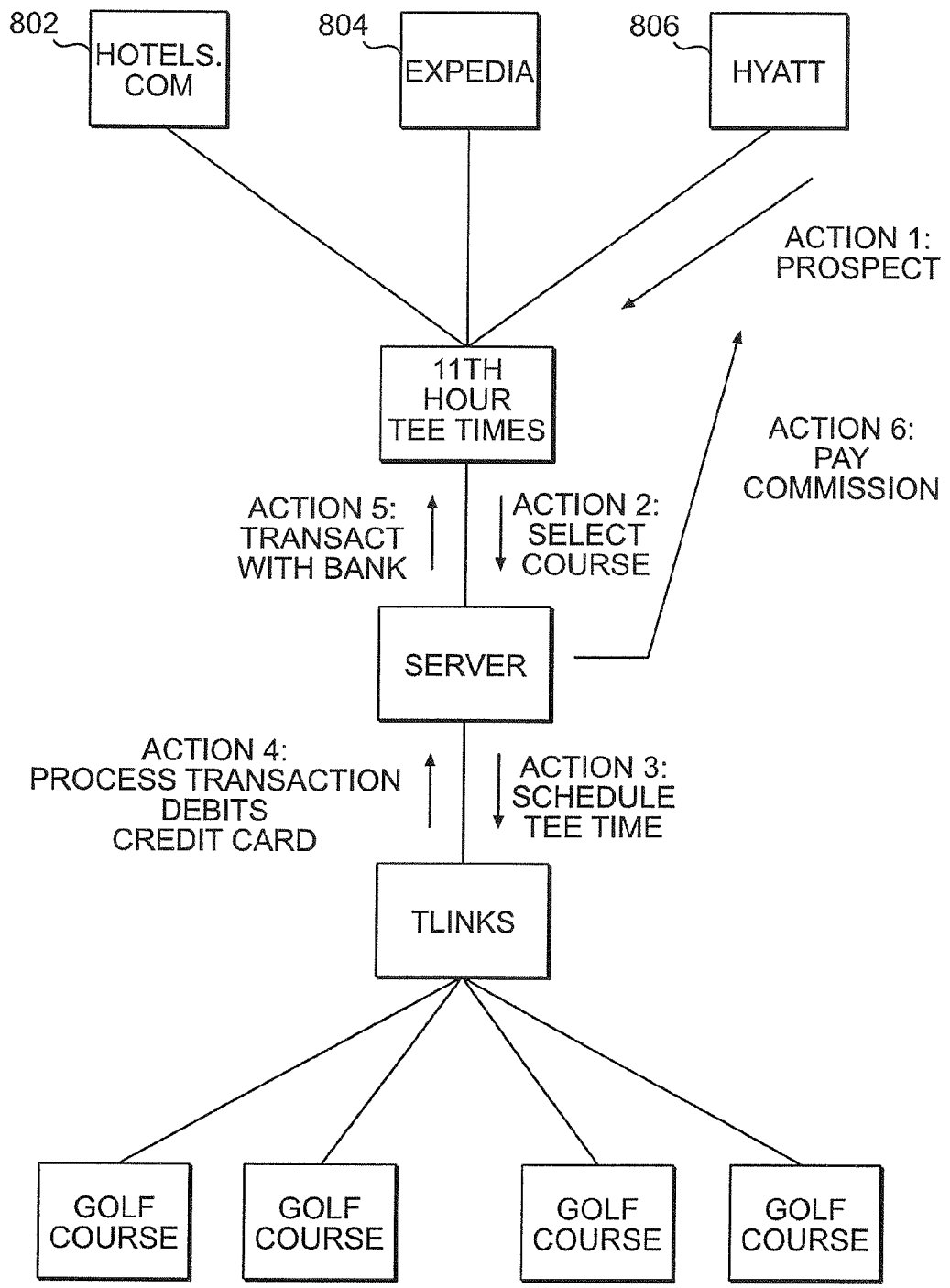
FIG. 8B depicts an exemplary process performed within the system environment as the consumer schedules tee times consistent with some embodiments of the present invention.

FIG. 8B depicts the process performed within the system environment as the consumer schedules tee times.

It may be appreciated by one of ordinary skill in the art that the features discussed herein are directed to a horizontal application, which may be applied against any vertical market.

Features consistent with principles of some embodiments of the present invention, further provide for the Resource Optimizing Smart Mail Commerce System, a way to create custom packages for individuals within lists. A completely opt-in system, the system is a Content Tool designed to send and receive mail via e-mail, postcards, or other channels (methods of delivery). It maximizes information (i.e. content, demographics, etc.) by creating dynamic individually generated e-mails or postcards based upon selects or criterion and rules (to verify the compatibility of various combined criteria), and various channels of delivery may be utilized to send the individually generated information to the recipient. A push/send list is thus created from customer information based upon rules and characteristics. The system is designed to determine whether or not selects or criterion can be combined or are mutually exclusive. The ability to determine exclusivity and to resolve conflicts is a characteristic of the system, which creates designated individualized packages (with regard to e-mail it may in the form of an HTML and text e-mail) for opt-in consumers whose demographics/information are already known.

The system uses a dynamic commerce system that allows for easy variance of the criterion and rules. Individuals who receive e-mails or postcards created via the System may not see alternatives in the postcard or e-mail itself. In other words, the e-mail or postcard may come as an already designated package (targeted to the person as a package with all things the person would want to do) which may not be manipulated or altered by the consumer. Rather, as discussed above, if the channel of delivery is via e-mail, the recipient of the e-mail, upon clicking on the e-mail itself, will be sent to a given URL or web page where he/she can make a purchase and possibly see alternatives to the designated package, which was constructed for him/her. If the channel of delivery is a postcard or mailed package, the consumer can either go to the URL address given on the postcard and proceed accordingly or can call a specified number included within the postcard itself to make a reservation and purchase.

EXAMPLES

1. Bob's Vacation World owns a resort/condo complex, some golf courses, and several restaurants in the Orlando area. Bob calls Zmail to ask for assistance in sending out vacation package information to vacationers who have previously stayed at Bob's Vacation World. Bob sends his list of previous vacationers along with various demographic and specific information about them to Zmail. This list is used to create selects or, criterion and a logical rule-based system in the form of an interface. These are the Bob's Vacation World rules which, along with a series of default rules provided by the administrator (if Bob's Vacation World's rules do not apply or the demographic/specific information is not available), determine the content of the e-mail or postcard. The system will allow a "Golf and Gourge" package to go out to those who have expressed an interest in golf and an interest in buffet-style eateries. Individuals on the list who have indicated such interests will receive an e-mail or postcard created just for them—they will be given a package consisting of nothing but golf, food, and accommodations. Individuals who have expressed no specific interest in golf and buffet-style restaurants might receive the default "Disneyland" package, which may consist of a combination of lodging, eating, and entry to Disneyworld.

2. A restaurant provides a discounted 5-course meal to would-be patrons. To some of their potential customers, the restaurant provides a package deal of steak, potato, dessert, etc. and to other potential patrons (who are vegetarians) a vegetarian ensemble of foods.

3. An Electronics Boutique offers discounts to would-be customers if they buy sets or packages of electronic devices at the same time.

The System is also designed to prevent the generation of contradictory postcards or e-mails or illogical combinations by implementing rules. Certain combinations of variables will not be allowed by the system if they are illogical, present time conflicts (i.e. someone is staying for one day at a resort; it would not make sense to send that person an offer to visit two theme parks), or are inconsistent.

Figure 9:
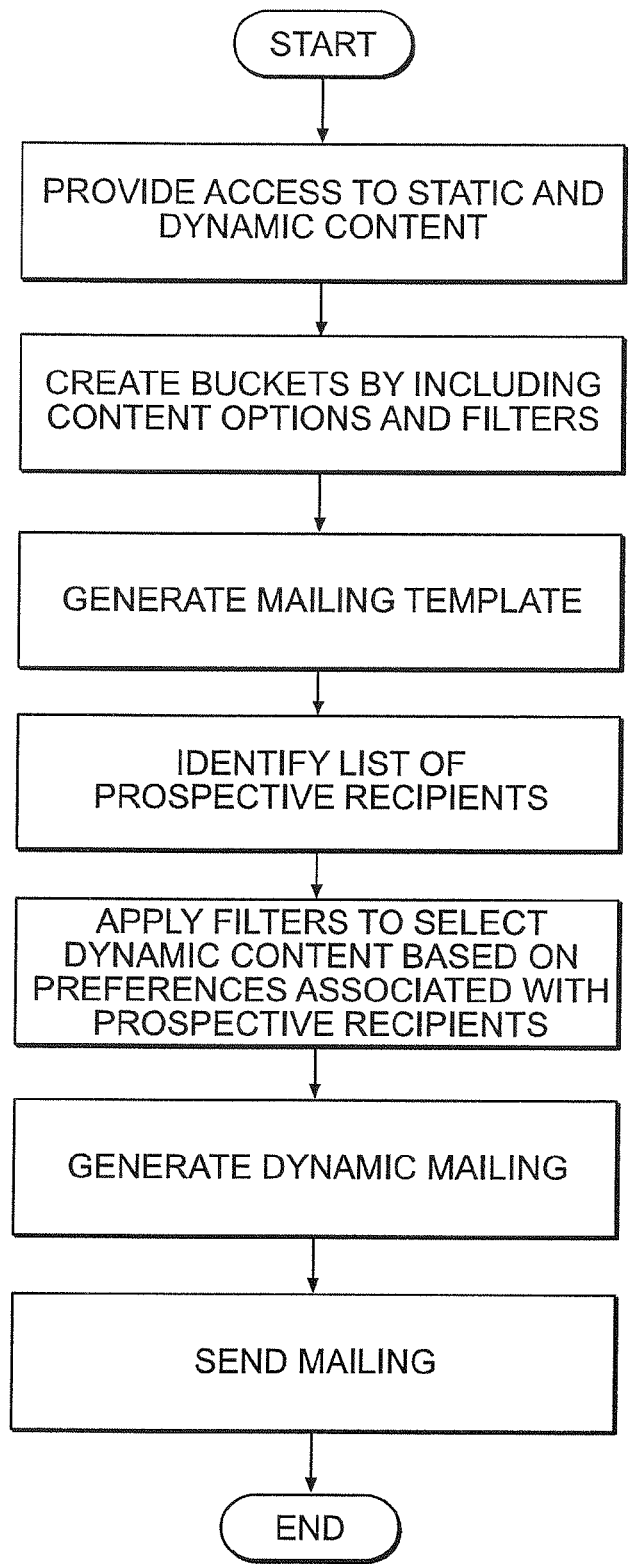
FIG. 9 depicts an exemplary flow diagraph of the steps performed in generating dynamic mailings consistent with some embodiments of the present invention.

FIG. 9 depicts an exemplary flow diagram that describes the system disclosed herein consistent with some embodiments of the present invention. As shown in FIG. 9, static and dynamic content are stored in database 110 for access by the user in creating a dynamically generated e-mail (Step 902). Alternatively, the content may be obtained from a remote device.

The user may also create a set of questions to be presented to potential consumers who choose to opt-into the system. The user may configure the questions in a manner described with regard to the dynamic data profiling module discussed above.

In establishing the information to be included in the e-mail, the user entered information into buckets (Step 904). The information to be included in the buckets includes at least one content designation, static and/or dynamic and filters that are used to select which content should be selected from the bucket. The buckets are additionally identified as mandatory and optional. If the bucket is mandatory, then one piece of content must be selected for including in the mailing. If the bucket is optional, then if, after applying the filters, there is no appropriate content to select, no content may be selected from the optional bucket for including in the mailing. Typically only one piece of content may be selected from each bucket.

In addition to the above information, the user may associate at least one rate with each piece of content. This rate represents how much value is associated with each piece of content. In establishing the information with each bucket, the user selects a rate to be associated with each piece of content that is included in the bucket. As the dynamic mailing is generated, and the content is selected from each bucket, a total value for the mailing is generated by adding each value associated with each piece of selected content.

By using the HTML formatting tool discussed above, the user may generate a generic e-mail template (Step 906). During this process, the user identifies areas in the mailing that correspond to the content that is to be selected from each of the buckets. The user may also use the HTML formatting tool to add and format the content, text, border content, etc.

The user may then identify a list of prospective recipients or consumers (Step 908). This list may be stored in database 110. The list of prospective recipients includes preferences associated with each of the prospective recipients. The filters are then applied to the identified list where the content identified in the buckets is selected based upon the preferences stored in the database 110 (Step 910). A mailing blast is then generated (Step 912) which establishes a set of mailings to be sent. The mailings may then be transmitted (Step 914).

Optionally, prior to transmitting the mailings, the template or the completed mailing may be processed through the efficiency of delivery module to determine the likelihood of success of a successful transmission to see if any spam software is likely to block the mailing transmission.

Modifications and adaptations of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for obtaining information for use in dynamic mailings, the method comprising:
   storing a set of processed-based questions;
   providing a user an opportunity to opt-into a system;
   upon receipt of confirmation of an opt-in, querying the user with a plurality of processed-based questions selected from the stored set via a network, wherein selection of at least one of the processed-based questions during the query is based on the user's response to a previous question during the query;
   storing at least one of the user's responses to the plurality of processed-based questions as information in a computer database and storing an association between the information and the user;
   generating a dynamic mailing including content that is selected based on the stored information; and
   transmitting the dynamic mailing to an email address of the user via the network.

2. The method of claim 1, wherein selection of all subsequent questions queried to the user is based on the response of a previous question queried to the user.

3. The method of claim 1, further comprising:
   obtaining information through the user's web page access history;
   associating the information with the user; and
   storing the information.

4. The method of claim 1, wherein the step of generating a dynamic mailing includes:
   generating a first e-mail including the content that is selected based on the stored information;
   simulating the transmission of the first email through a SPAM filter;
   if the simulated transmission indicates a high probability of the first email being blocked by a SPAM filter, utilizing the first e-mail as the dynamic mailing; and
   if the simulated transmission indicates a high probability of the first email being blocked by a SPAM filter, modifying the first e-mail in order to generate a second email to be used as the dynamic mailing.

5. The method of claim 4, wherein if the simulated transmission indicates a high probability of the first email being blocked by a SPAM filter, the first email is modified by:
   identifying content in the first email that could cause a SPAM filter to block the first email, and modifying the identified content in order to generate the second email.

6. The method of claim 5, wherein the simulated transmission through a SPAM filter is repeated based on the modification to the identified content.

7. An apparatus for obtaining information for use in dynamic mailings, comprising:
   memory storing instructions; and
   a processor for executing the instructions to perform a method including:
      storing a set of process-based questions;
      providing a user an opportunity to opt-into a system;
      upon receipt of confirmation of an opt-in, querying the user with a plurality of processed-based questions selected from the stored set, wherein selection of at least one of the process-based questions during the query is based on the user's response to a previous question during the query;
      storing at least one of the user's responses to the plurality of processed-based questions as information and storing an association between the information and the user;
      generating a dynamic mailing including content that is selected based on the stored information; and
      transmitting the dynamic mailing to an email address of the user.

8. The apparatus of claim 7, wherein selection of all subsequent questions queried to the user is based on the response of a previous question queried to the user.

9. The apparatus of claim 7, further comprising:
   obtaining information through the user's web page access history;
   associating the information with the user; and
   storing the information.

10. The apparatus of claim 7, wherein the step of generating a dynamic mailing includes:
   generating a first e-mail including the content that is selected based on the stored information;
   simulating the transmission of the first email through a SPAM filter;
   if the simulated transmission indicates a high probability of the first email being blocked by a SPAM filter, utilizing the first e-mail as the dynamic mailing; and
   if the simulated transmission indicates a high probability of the first email being blocked by a SPAM filter, modifying the first e-mail in order to generate a second email to be used as the dynamic mailing.

11. The apparatus of claim 10, wherein if the simulated transmission indicates a high probability of the first email being blocked by a SPAM filter, the first email is modified by:

identifying content in the first email that could cause a SPAM filter to block the first email, and modifying the identified content in order to generate the second email.

12. The apparatus of claim 11, wherein the simulated transmission through a SPAM filter is repeated based on the modification to the identified content.

13. A non-transitory computer-readable medium storing instructions, executed by a processor, for performing a method for obtaining information for use in dynamic mailings, the method comprising:
    storing a set of processed-based questions;
    providing a user an opportunity to opt-into a system;
    upon receipt of confirmation of an opt-in, querying the user a plurality of processed-based questions selected from a stored set, wherein selection of at least one of the processed-based questions during the query is based on the user's response to a previous question during the query;
    storing at least one of the user's responses to the plurality of processed-based questions as information and storing an association between the information and the user;
    generating a dynamic mailing including content that is selected based on the stored information; and
    transmitting the dynamic mailing to an email address of the user.

14. The computer-readable medium of claim 13, wherein selection of all subsequent questions queried to the user is based on the response of a previous question queried to the user.

15. The computer-readable medium of claim 13, further comprising:
    obtaining information through the user's web page access history;
    associating the information with the user; and
    storing the information.

16. The computer-readable medium of claim 13, wherein the step of generating the dynamic mailing includes:
    generating a first e-mail including the content that is selected based on the stored information;
    simulating the transmission of the first email through a SPAM filter;
    if the simulated transmission indicates a high probability of the first email being blocked by a SPAM filter, utilizing the first e-mail as the dynamic mailing; and
    if the simulated transmission indicates a high probability of the first email being blocked by a SPAM filter, modifying the first e-mail in order to generate a second email to be used as the dynamic mailing.

17. The computer-readable medium of claim 16, wherein if the simulated transmission indicates a high probability of the first email being blocked by a SPAM filter, the first email is modified by:
    identifying content in the first email that could cause a SPAM filter to block the first email, and modifying the identified content in order to generate the second email.

18. The computer-readable medium of claim 17, wherein the simulated transmission through a SPAM filter is repeated based on the modification to the identified content.

* * * * *